United States Patent
Blaauw et al.

(10) Patent No.: US 7,320,091 B2
(45) Date of Patent: Jan. 15, 2008

(54) ERROR RECOVERY WITHIN PROCESSING STAGES OF AN INTEGRATED CIRCUIT

(75) Inventors: David T. Blaauw, Ann Arbor, MI (US); David Michael Bull, Balsham (GB); Shidhartha Das, Ann Arbor, MI (US)

(73) Assignees: ARM Limited, Cambridge (GB); University of Michigan, Ann Arbor, MI (US)

( * ) Notice: Subject to any disclaimer, the term of this patent is extended or adjusted under 35 U.S.C. 154(b) by 442 days.

(21) Appl. No.: 11/110,961

(22) Filed: Apr. 21, 2005

(65) Prior Publication Data

US 2005/0246613 A1 Nov. 3, 2005

Related U.S. Application Data

(63) Continuation of application No. 10/779,805, filed on Feb. 18, 2004, now Pat. No. 7,162,661, which is a continuation-in-part of application No. 10/392,382, filed on Mar. 20, 2003, now Pat. No. 7,278,080.

(51) Int. Cl.
*G06F 11/00* (2006.01)

(52) U.S. Cl. .................. 714/30; 714/55; 714/708; 714/819

(58) Field of Classification Search .............. 714/30, 714/55, 708, 819
See application file for complete search history.

(56) References Cited

U.S. PATENT DOCUMENTS 3,893,070 A 7/1975 Bossen et al.

(Continued)

FOREIGN PATENT DOCUMENTS

EP 0 366 331 5/1990

(Continued)

OTHER PUBLICATIONS

Enomoto et al, "A low-power, high speed 0.25µm GaAs D-FF" Proceedings of the 23rd European Solid-State Circuits Conference, 1997, ESSCIRC '97, Sep. 16-18, 1997, pp. 300-303.

(Continued)

*Primary Examiner*—Stephen M. Baker
(74) *Attorney, Agent, or Firm*—Nixon & Vanderhye P.C.

(57) ABSTRACT

An integrated circuit includes a plurality of processing stages each including processing logic 1014, a non-delayed signal-capture element 1016, a delayed signal-capture element 1018 and a comparator 1024. The non-delayed signal-capture element 1016 captures an output from the processing logic 1014 at a non-delayed capture time. At a later delayed capture time, the delayed signal-capture element 1018 also captures a value from the processing logic 1014. An error detection circuit 1026 and error correction circuit 1028 detect and correct random errors in the delayed value and supplies an error-checked delayed value to the comparator 1024. The comparator 1024 compares the error-checked delayed value and the non-delayed value and if they are not equal this indicates that the non-delayed value was captured too soon and should be replaced by the error-checked delayed value. The non-delayed value is passed to the subsequent processing stage immediately following its capture and accordingly error recovery mechanisms are used to suppress the erroneous processing which has occurred by the subsequent processing stages, such as gating the clock and allowing the correct signal values to propagate through the subsequent processing logic before restarting the clock. The operating parameters of the integrated circuit, such as the clock frequency, the operating voltage, the body biased voltage, temperature and the like are adjusted so as to maintain a finite non-zero error rate in a manner that increases overall performance.

21 Claims, 30 Drawing Sheets

U.S. PATENT DOCUMENTS

| | | | |
|---|---|---|---|
| 3,905,023 A | | 9/1975 | Perpiglia |
| 4,339,657 A | | 7/1982 | Larson et al. |
| 4,633,465 A | * | 12/1986 | Fitch et al. .................. 714/709 |
| 4,669,092 A | | 5/1987 | Sari et al. |
| 4,756,005 A | | 7/1988 | Shedd |
| 4,918,709 A | * | 4/1990 | Fitch .......................... 375/328 |
| 4,975,930 A | * | 12/1990 | Shaw .......................... 375/376 |
| 5,043,990 A | | 8/1991 | Doi et al. |
| 5,203,003 A | | 4/1993 | Donner |
| 5,276,690 A | | 1/1994 | Lee et al. |
| 5,291,496 A | | 3/1994 | Andaleon et al. |
| 5,313,625 A | | 5/1994 | Hess et al. |
| 5,321,705 A | | 6/1994 | Gould et al. |
| 5,400,370 A | * | 3/1995 | Guo ............................ 375/371 |
| 5,402,273 A | * | 3/1995 | Tucker ........................ 360/51 |
| 5,408,200 A | * | 4/1995 | Buhler ........................ 331/1 A |
| 5,426,746 A | | 6/1995 | Sekiguchi |
| 5,455,536 A | | 10/1995 | Kono et al. |
| 5,463,351 A | * | 10/1995 | Marko et al. ................ 331/1 A |
| 5,504,859 A | | 4/1996 | Gustafson et al. |
| 5,528,637 A | | 6/1996 | Sevenhans et al. |
| 5,553,232 A | | 9/1996 | Wilhite et al. |
| 5,572,662 A | | 11/1996 | Ohta et al. |
| 5,615,263 A | | 3/1997 | Takahashi |
| 5,625,652 A | * | 4/1997 | Petranovich ................ 375/355 |
| 5,627,412 A | | 5/1997 | Beard |
| 5,737,369 A | | 4/1998 | Retzer |
| 5,859,551 A | | 1/1999 | Ohishi et al. |
| 5,870,446 A | | 2/1999 | McMahan et al. |
| 5,914,903 A | | 6/1999 | Kanma et al. |
| 6,067,256 A | | 5/2000 | Yamashita et al. |
| 6,114,880 A | | 9/2000 | Buer et al. |
| 6,167,526 A | * | 12/2000 | Carlson ....................... 713/400 |
| 6,173,423 B1 | | 1/2001 | Autechaud et al. |
| 6,188,610 B1 | | 2/2001 | Kakizoe et al. |
| 6,222,660 B1 | | 4/2001 | Traa |
| 6,476,643 B2 | | 11/2002 | Hugues et al. |
| 6,523,201 B1 | | 2/2003 | De Michele |
| 6,693,985 B2 | | 2/2004 | Li et al. |
| 6,741,110 B2 | | 5/2004 | Roisen |
| 6,772,388 B2 | | 8/2004 | Cooper et al. |
| 6,799,292 B2 | | 9/2004 | Takeoka et al. |
| 6,834,367 B2 | | 12/2004 | Bonneau et al. |
| 6,907,553 B2 | | 6/2005 | Popplewell et al. |
| 6,944,468 B2 | | 9/2005 | Okumura |
| 6,958,627 B2 | | 10/2005 | Singh et al. |
| 6,977,910 B1 | | 12/2005 | Hosur et al. |
| 7,010,074 B2 | | 3/2006 | Nakamura |
| 7,046,056 B2 | | 5/2006 | Kizer et al. |
| 7,085,993 B2 | | 8/2006 | Goodnow et al. |
| 7,096,137 B2 | | 8/2006 | Shipton et al. |
| 7,116,744 B2 | | 10/2006 | Saze et al. |
| 7,142,623 B2 | | 11/2006 | Sorna |
| 7,162,661 B2 | | 1/2007 | Mudge et al. |
| 2001/0016927 A1 | | 8/2001 | Poisner |
| 2002/0038418 A1 | | 3/2002 | Shimamura |

FOREIGN PATENT DOCUMENTS

| | | |
|---|---|---|
| EP | 0 374 420 | 6/1990 |
| EP | 0 653 708 | 5/1995 |
| JP | 60-20398 | 2/1985 |
| JP | 62-24498 | 2/1987 |
| JP | 2001-175542 | 6/2001 |
| SU | 809350 | 2/1981 |
| WO | WO 00/54410 | 9/2000 |
| WO | WO 01/46800 | 6/2001 |
| WO | WO 2004/084072 | 9/2004 |

OTHER PUBLICATIONS

N. Kanekawa et al, "Fault Detection and Recovery Coverage Improvement by Clock Synchronized Suplicated Systems with Optimal Time Diversity" *Fault-Tolerant Computing*, Jun. 1998, pp. 196-200.

"ARM710 Data Sheet" Dec. 1994, Advanced RISC Machines Ltd. (ARM).

F. Worm et al, "An Adaptive Low-Power Transmission Scheme for On-Chip Networks" *ISSS'02*, Oct. 2002, pp. 92-100.

\* cited by examiner

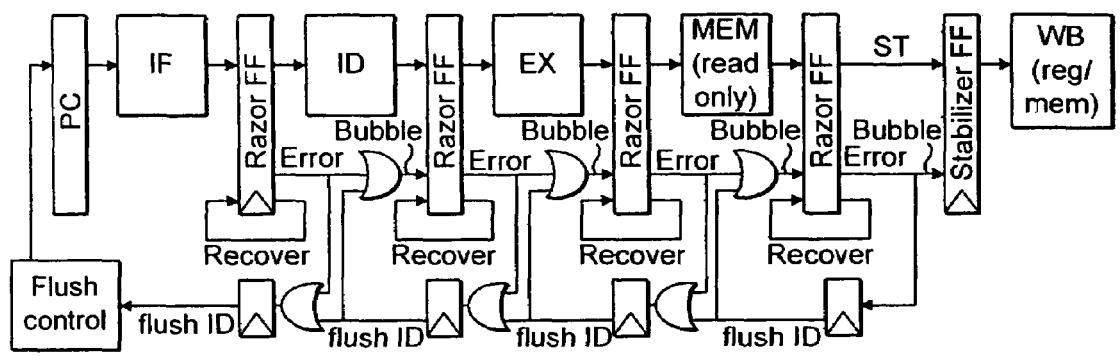
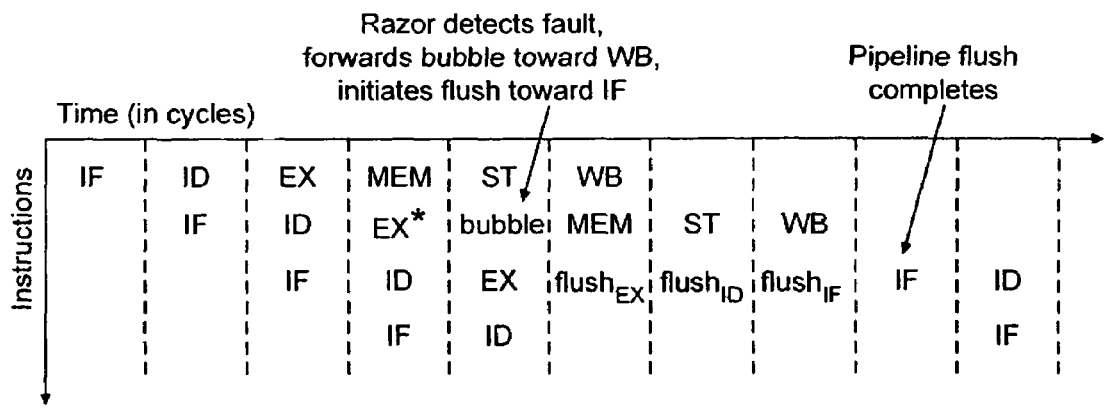
FIG. 20

ERROR DETECTION AND RECOVERY PROCESS

OPERATIONAL PARAMETER TUNING PROCESS

ERROR SIGNAL SYNCHRONISATION

ERROR RECOVERY WITHIN PROCESSING STAGES OF AN INTEGRATED CIRCUIT

This application is a continuation of application Ser. No. 10/779,805, filed Feb. 18, 2004, now U.S. Pat. No. 7,162,661, which is a continuation-in-part of application Ser. No. 10/392,382, filed Mar. 20, 2003, now U.S. Pat. No. 7,278,080 the entire contents of which is hereby incorporated by reference in this application.

BACKGROUND OF THE INVENTION

1. Field of the Invention

This invention relates to the field of integrated circuits. More particularly, this invention relates to the detection of operational errors within the processing stages of an integrated circuit and recovery from such errors.

2. Description of the Prior Art

It is known to provide integrated circuits formed of serially connected processing stages, for example a pipelined circuit. Each processing stage comprises processing logic and a latch for storing an output value from one stage which is subsequently supplied as input to the succeeding processing stage. The time taken for the processing logic to complete its processing operation determines the speed at which the integrated circuit may operate. The fastest rate at which the processing logic can operate is constrained by the slowest of the processing logic stages. In order to process data as rapidly as possible, the processing stages of the circuit will be driven at as rapid a rate as possible until the slowest of the processing stages is unable to keep pace. However, in situations where the power consumption of the integrated circuit is more important that increasing the processing rate, the operating voltage of the integrated circuit will be reduced so as to reduce power consumption to the point at which the slowest processing stage is no longer able to keep pace. Both the situation where the voltage level is reduced to the point at which the slowest processing stage can no longer keep pace and the situation where the operating frequency is increased to the point at which the slowest processing stage can no longer perform its processing will give rise to the occurrence of processing errors that will adversely effect the forward-progress of the computation.

It is known to avoid the occurrence of such processing errors by setting an integrated circuit to operate at a voltage level which is sufficiently above a minimum voltage level and at a processing frequency that is sufficiently less than the maximum desirable processing frequency taking into account properties of the integrated circuits including manufacturing variation between different integrated circuits within a batch, operating environment conditions, such as typical temperature ranges, data dependencies of signals being processed and the like. This conventional approach is cautious in restricting the maximum operating frequency and the minimum operating voltage to take account of the worst case situations.

US Patent Application Publication No. US2004-0199821, discloses a system in which an integrated circuit is arranged to operate so as to maintain a non-zero rate of errors in operation by dynamically controlling at least one performance controlling parameter, such as frequency, operating voltage, or temperature. This system enables forward progress of the computation, despite the presence of timing errors, by the use of a delayed latch that captures data at a point later in time than the main latch of the associated processing stage of the integrated circuit. The data value captured by the delayed latch is used in the event of detection of an error to replace the value captured by the main latch at a point in time before the output of the processing stage was stable. By deliberately operating the integrated circuit at a non-zero error rate, an individual integrated circuit can be tuned to obtain the fastest possible processing speed or the lowest possible energy consumption as required by the particular processing application. However, the requirement to modify the processing circuit by providing a delayed latch for each main latch of the processing stages can in certain circumstances be inflexible. For example, if operational errors are not restricted to the datapath of the central processing unit (CPU), but also occur in the control logic itself or in other critical paths of the integrated circuits then a considerable number of delay latches would have to be added to the integrated circuit to implement the error detection and recovery. Furthermore, in embodiments of US-2004-0199821 that use existing pipeline sequencing logic to implement error recovery by reading data values from the delayed latches it may be difficult to ensure that the pipeline sequencing logic itself is not affected by errors in operation, either directly due to a critical path in the control logic itself or indirectly by feeding back a metastable value from the datapath into the control logic.

Thus, there is a need for a technique that enables improved performance to be derived from an integrated circuit yet does not require extensive modifications to existing integrated circuit design to accommodate error recovery operations.

SUMMARY OF THE INVENTION

Viewed from one aspect the present invention provides an integrated circuit for performing digital data processing, said integrated circuit comprising:

an error detection circuit operable to detect a transition in a signal value in a predetermined time window within said integrated circuit indicative of an error in operation of said integrated circuit;

an error-recovery circuit responsive to said error detection circuit and operable to enable said integrated circuit to recover from said error in operation;

an operational parameter controller operable to control one or more performance controlling operational parameters of said integrated circuit;

wherein said operational parameter controller dynamically controls at least one of said one or more performance controlling parameters in dependence upon one or more characteristics of errors detected by said error detection circuit to maintain a non-zero rate of errors in operation, said error-recovery circuit being operable to enable the integrated circuit to recover from said errors in operation such that data processing by said integrated circuit continues.

The present technique recognises that the operation of processing stages can be directly monitored to find the limiting conditions in which they fail. When errors are detected an error recovery circuit is responsive to detection of an error to initiate error recovery so that incorrect operation overall is not produced. The advantages achieved by the avoidance of excessively cautious performance margins in the previous approaches compared with the direct observation of the failure point in the present approach more than compensates for the additional time and power consumed in recovering the system when a failure does occur. Deliberately allowing such processing errors to occur such that critical paths fail to meet their timing requirements I highly counter-intuitive in this technical field where it is normal to take considerable efforts to ensure that all critical paths always do meet their timing requirements.

Although the error recovery circuit could operate in a number of different ways, in one embodiment a storage unit is provided to store a recoverable state of the data processing apparatus and the error recovery circuit uses the stored recoverable state to enable the integrated circuit to recover from the errors in operation.

The stored recoverable state comprises at least a subset of architectural state variables corresponding to a programmers model of the integrated circuit. Using the stored recoverable state the error detection can be performed without the requirement to capture a delayed value from each processing stage or the requirement to reload the correct values into the processing logic in the event of an error in operation. This enables integrated circuits to be relatively easily modified so that the error detection and recovery can be applied to any critical path within the integrated circuit including both CPU data paths and control logic.

The recoverable state stored by the storage unit (which may be multiple storage elements dispersed throughout the integrated circuit) could comprise at least a subset of architectural state variables corresponding to the programmer's model, such as register values, flag values and processing modes. However, in one embodiment the recoverable state comprises at least a subset of micro-architectural state variables that are not part of the programmer's model such as, for example, information on variables stored in cache. This arrangement provides flexibility in the error recovery capability of the integrated circuit since different errors in operation will require different subsets of recoverable state in order to return the integrated circuit to a state from which forward-progress of the computation can be reliably performed. It will be appreciated that some errors in operation will have effects that propagate to more state variables and different types of state variables than other errors in operation.

It will be appreciated that the error detection circuit could detect the error in operation in a number of different ways. However, in one embodiment the error detection circuit is arranged to detect a transition in a data value by calculating a difference between an input signal value at a first sampling time and the same signal at a second, subsequent sampling time. Thus, any difference in the signal value within a time period when no difference in output is expected if the circuit is operating reliably, enables straight-forward detection of an error. In another embodiment the error detection circuit is arranged to detect a transition in the data signal by detecting any change of state in the signal value within a predetermined time window. This contrasts with the embodiment that involves two distinct sampling points by detecting a glitch in the signal value between two sampling points that would not otherwise be detected. Thus the detection of the transition the signal value is effectively continuous rather than discrete.

In one embodiment, the error detection circuit is operable to detect an error in an output signal of an associated processing circuit element of the integrated circuit. This enables effective correlation between the processing stage and the occurrence of an error. In alternative arrangements a detection circuit may be shared between a number of processing stages.

In one embodiment the integrated circuit has an error detection circuit having a metastability window that is mutually exclusive with a setup window of the associated processing circuit element (e.g. main flip-flop). This enables detection of an error in operation even when the input data transitions in the setup window of the main flip-flop. Arranging the metastability window of the error detection circuit such that it is non-overlapping with the setup window of the main latch associated with the processing stage obviates the need to provide a power-hungry metastability detection circuit and enables sensing of transitions in the data signal both during the set up window of the main latch of the processing stage and during the hold window of the clock signal that is the positive phase of the clock signal.

It will be appreciated that the integrated circuit could be a non-pipelined integrated circuit, but in one embodiment the integrated circuit is a pipelined integrated circuit comprising a plurality of serially connected processing stages.

Although the particular processing circuit element with which an error detection circuit is associated could be any circuit element capable of storing the processing value, for example a latching sense-amp, in one embodiment the processing circuit element is a latch for passing data between consecutive ones of a plurality of pipeline stages. A latch is a simple circuit element and association of an error detection circuit with a latch provides for efficient error-detection that is easy to implement.

In one embodiment the error detection circuit comprises at least one error delay element arranged to delay an input digital signal to enable detection of a transition occurring during a set-up time of the processing circuit element. This avoids the possibility of an error in operation being missed when a data transition occurs during the set-up time of the main processing circuit element, since in such a case the logic state of that processing element would otherwise be unresolved. Delaying the digital signal has the effect of aligning the data transition for the input to the error detection circuit such that the sampling window of the error detection circuit overlaps the setup window of the main processing element causing signal transitions in the setup window of the main processing element to be reliably detected as errors in the error detection circuit.

It will be appreciated that the error detection circuit could take many different forms but in one embodiment the error detection circuit comprises at least one of a zero-to-one transition detector and a one-to-zero transition detector. These transition detectors could be distinct detectors or could be a single circuit operable to detect transitions of both orientations.

Although the integrated circuit could recover from errors in operation by flushing the pipeline of erroneous values and restoring a previous state directly from the reusable state store, in one embodiment the error recovery circuit comprises at least one stability pipeline stage operable to enable a verification of output values of the plurality of pipeline stages in the pipelined integrated circuit prior to commitment of those output values as stored state variables of the integrated circuit. The stability pipeline stages allow sufficient time to determine whether an error has occurred in the production of output values of the pipeline states and this reduces the likelihood that committed state variables will be corrupted.

Although inclusion of at least one stability pipeline stage in the error recovery circuit may involve delay in committal of calculated pipeline values, in one embodiment the integrated circuit comprises data forwarding circuitry operable to supply a value calculated by a particular one of the plurality of pipeline stages directly from the particular pipeline stage to another different one of the plurality of pipeline stages for use as an input value. This reduces the impact of read-after-write hazards that could potentially arise from provision of the extra stability pipeline stages. The forwarding circuitry enables the value calculated by a previous processing stage to be supplied to a subsequent processing stage currently in the pipeline before that value has been committed to a register. This prevents the subsequent processing stage from using an incorrect input value.

It will be appreciated that the storage unit could be any type of memory, such as stack memory, but in one embodiment the storage unit includes a register bank. Although the register bank could be operable to store state variables before those state variables have been confirmed as being free of errors, in one embodiment the register bank is operable to store only confirmed state variables, the confirmed state variables having been confirmed to be free of timing violations. Thus, the state variables stored in the register bank are reliable state variables and can be used to recover from a subsequent detected error in operation of the integrated circuit.

It will be appreciated that the integrated circuit could comprise a single storage unit comprising a single register bank. However, in one embodiment the integrated circuit comprises a speculative register bank operable to store speculative state variables whose values have not been confirmed as being free of timing violations in addition to a confirmed register bank operable to store confirmed state variables whose values have been confirmed as being correct (stable) values. This enables a portion of the error recovery to be performed in parallel with the main processing. Thus, values in the speculative register bank are corrected using values from the confirmed register bank only in the event of the detection of an error in operation of the integrated circuit. At any one time the speculative register bank stores state variables for more advanced processing stages than the currently stored state variables in the confirmed register bank. In the event of an error, the error recovery circuit is operable to replace a subset of the speculative state variables in the speculative register bank by corresponding ones of the confirmed state variables from the confirmed register bank so that the processing can return to a previous stage at which the detected error in operation has not yet effected any of the state variables. This ensures forward-progress of the computation despite the occurrence of a processing error.

It will be appreciated that the operational parameter controller could be operable to adjust the performance controlling parameters in response to detection of an error in operation of the integrated circuit. The parameter adjustment could be performed immediately in response to detection of an error. For example the operating frequency could be reduced or the operating voltage increased to ensure that the likelihood of errors in operation is decreased. These adjustments could be perfromed at least temporarily. However, in one embodiment of the invention the response of adjusting the operational parameters by the operational parameter controller is damped so that the there is a time delay following detection of at least one error in operation before the adjustment of one or more of the performance controlling parameters. This allows the integrated circuit to assess the likelihood of the increased error rate persisting since such an increase may not be systematic and could be dealt with without adjustment of the operational parameters by simply re-executing the relevant sequence of processing operations. However, temporary adjustment of one or more operational parameters may be performed to prevent deadlock.

According to a second aspect the present invention provides a method of controlling an integrated circuit for performing digital data processing, said method comprising the steps of:

detecting a transition in a signal value in a predetermined time window within said integrated circuit indicative of an error in operation of said integrated circuit;

responding to said detection of an error in operation by enabling said integrated circuit to recover from said error in operation;

controlling one or more performance controlling operational parameters of said integrated circuit;

wherein at least one of said one or more performance controlling parameters is dynamically controlled in dependence upon one or more characteristics of errors detected in said detecting step to maintain a non-zero rate of errors in operation, said errors in operation being recovered from such that data processing by said integrated circuit continues.

The above, and other objects, features and advantages of this invention will be apparent from the following detailed description of illustrative embodiments which is to be read in connection with the accompanying drawings.

BRIEF DESCRIPTION OF THE DRAWINGS

FIGS. 19 and 20 schematically illustrate respective uses of stalls and bubble insertion in recovering from errors.

DESCRIPTION OF THE PREFERRED EMBODIMENTS

Figure 1:
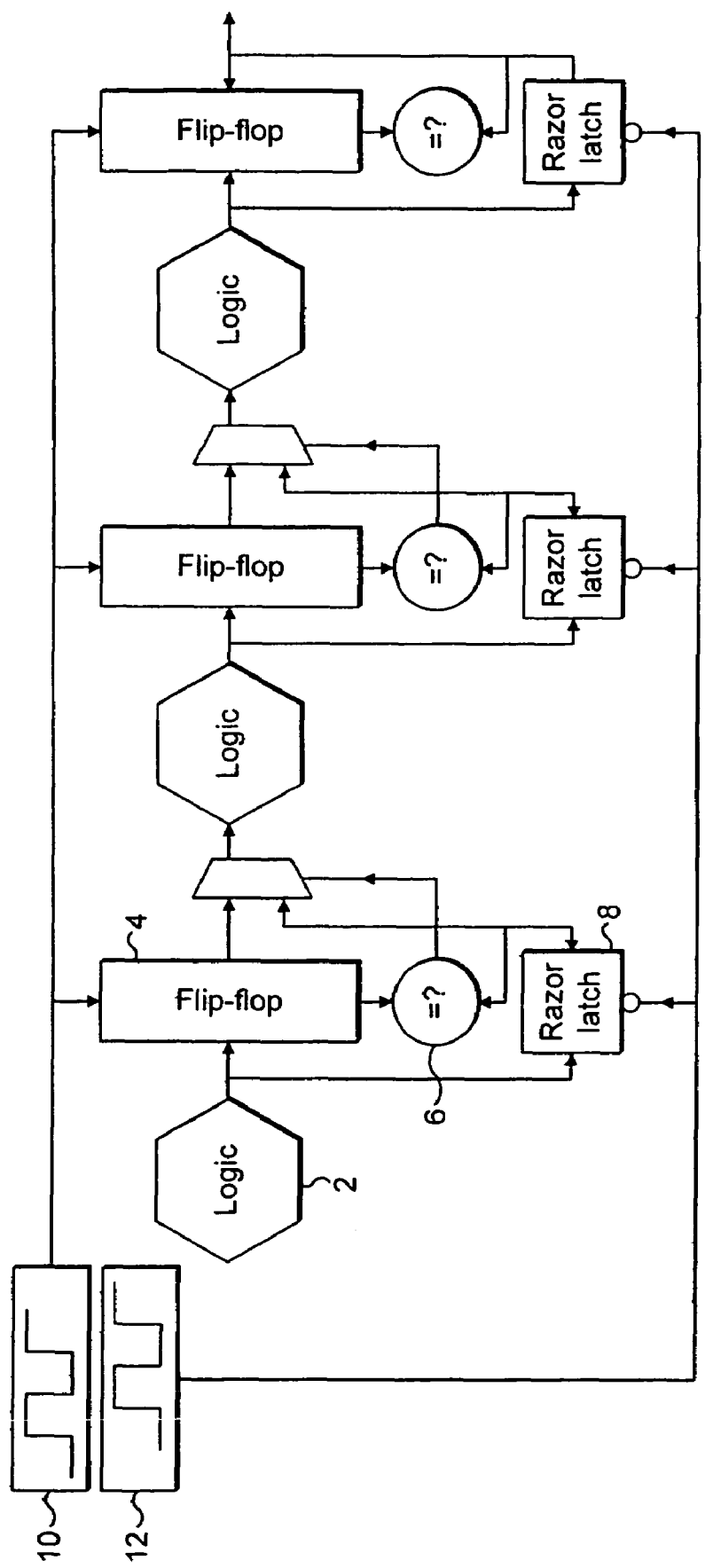
FIG. 1 schematically illustrates a plurality of processing stages to which the present technique is applied.

FIG. 1 illustrates a part of an integrated circuit, which may be a part of a synchronous pipeline within a processor core, such as an ARM processor core produced by ARM limited of Cambridge, England. The synchronous pipeline is formed of a plurality of like processing stages. The first stage comprises processing logic 2 followed by a non-delayed latch 4 in the form of a flip-flop together with a comparator 6 and a delayed latch 8. The term latch used herein encompasses any circuit element operable to store a signal value irrespective of triggering, clock and other requirements. Subsequent processing stages are similarly formed. A non-delayed clock signal 10 drives the processing logic and non-delayed latches 4 within all of the processing stages to operate synchronously as part of a synchronous pipeline. A delayed clock signal 12 is supplied to the delayed latches 8 of the respective processing stages. The delayed clock signal 12 is a phase shifted version of the non-delayed clock signal 10. The degree of phase shift controls the delay period between the capture of the output of the processing logic 2 by the non-delayed latch 4 and the capture of the output of the processing logic 2 at a later time performed by the delayed latch 8. If the processing logic 2 is operating within limits given the existing non-delayed clock signal frequency, the operating voltage being supplied to the integrated circuit, the body bias voltage, the temperature etc, then the processing logic 2 will have finished its processing operations by the time that the non-delayed latch 4 is triggered to capture its value. Consequently, when the delayed latch 8 later captures the output of the processing logic 2, this will have the same value as the value captured within the non-delayed latch 4. Accordingly, the comparator 6 will detect no change occurring during the delay period and error-recovery operation will not be triggered. Conversely, if the operating parameters for the integrated circuit are such that the processing logic 2 has not completed its processing operation by the time that the non-delayed latch 4 captures its value, then the delayed latch 8 will capture a different value and this will be detected by the comparator 6 thereby forcing an error-recovery operation to be performed. It will be seen that the error-recovery operation could be to replace the output of the non-delayed latch 4 which was being supplied to the following processing stage during the time following its capture with the delayed value stored within the delayed latch 8. This delayed value may additionally be forced to be stored within the non-delayed latch 4 replacing the previously erroneously captured value stored therein.

A meta-stability detector 7 serves to detect meta-stability in the output of the non-delayed latch 4, i.e. not at a clearly defined logic state. If such meta-stability is detected, then this is treated as an error and the value of the delay latch 6 is used instead.

On detection of an error, the whole pipeline may be stalled by gating the non-delayed clock signal 10 for an additional delayed period to give sufficient time for the processing logic in the following processing stage to properly respond to the corrected input signal value being supplied to it. Alternatively, it is possible that upstream processing stages may be stalled with subsequent processing stages being allowed to continue operation with a bubble inserted into the pipeline in accordance with standard pipeline processing techniques using a counterflow architecture (see the bubble and flush latches of FIG. 2). Another alternative is that the entire processing pipeline may be reset with the delayed latch values being forced into the non-delayed latches of each stage and processing resumed. The re-use of the delayed latch value in place of the erroneous value rather than an attempted recalculation ensures that forward progress is made through the processing operations even though an error has occurred.

There are constraints relating to the relationship between the processing time taken by the processing logic within the processing stages and the delay between the non-delayed capture time and the delayed capture time. In particular, the minimum processing time of any processing stage should not be less than the delay in order to ensure that the delayed value captured is not corrupted by new data being outputted from a short delay processing stage. It may be necessary to pad short delay processing stages with extra delay elements to ensure that they do not fall below this minimum processing time. At the other extreme, it needs to be ensured that the maximum processing delay of the processing logic within a processing stage that can occur at any operational point for any operating parameters is not greater than the sum of the normal non-delayed operating clock period and the delay value such that the delay value captured in the delay value latch is ensured to be stable and correct.

There are a number of alternative ways in which the system may be controlled to tune power consumption and performance. According to one arrangement an error counter circuit (not illustrated) is provided to count the number of non-equal detections made by the comparator 6. This count of errors detected and recovered from can be used to control the operating parameters using either hardware implemented or software implemented algorithms. The counter is readable by the software. The best overall performance, whether in terms of maximum speed or lowest power consumption can be achieved by deliberately operating the integrated circuit with parameters that maintain a non-zero level of errors. The gain from operating non-cautious operating parameters in such circumstances exceeds the penalty incurred by the need to recover from errors.

According to an alternative arrangement, a hardware counter is provided as a performance monitoring module and is operable to keep track of useful work and of error recovery work. In particular, the counter keeps count of the number of useful instructions used to progress the processing operations being executed and also keeps count of the number of instructions and bubbles executed to perform error recovery. The software is operable to read the hardware counter and to use the count values to appropriately balance the overhead of error recovery and its effects on system performance against the reduced power consumption achieved by running the integrated circuit at a non-zero error rate.

Figure 2:
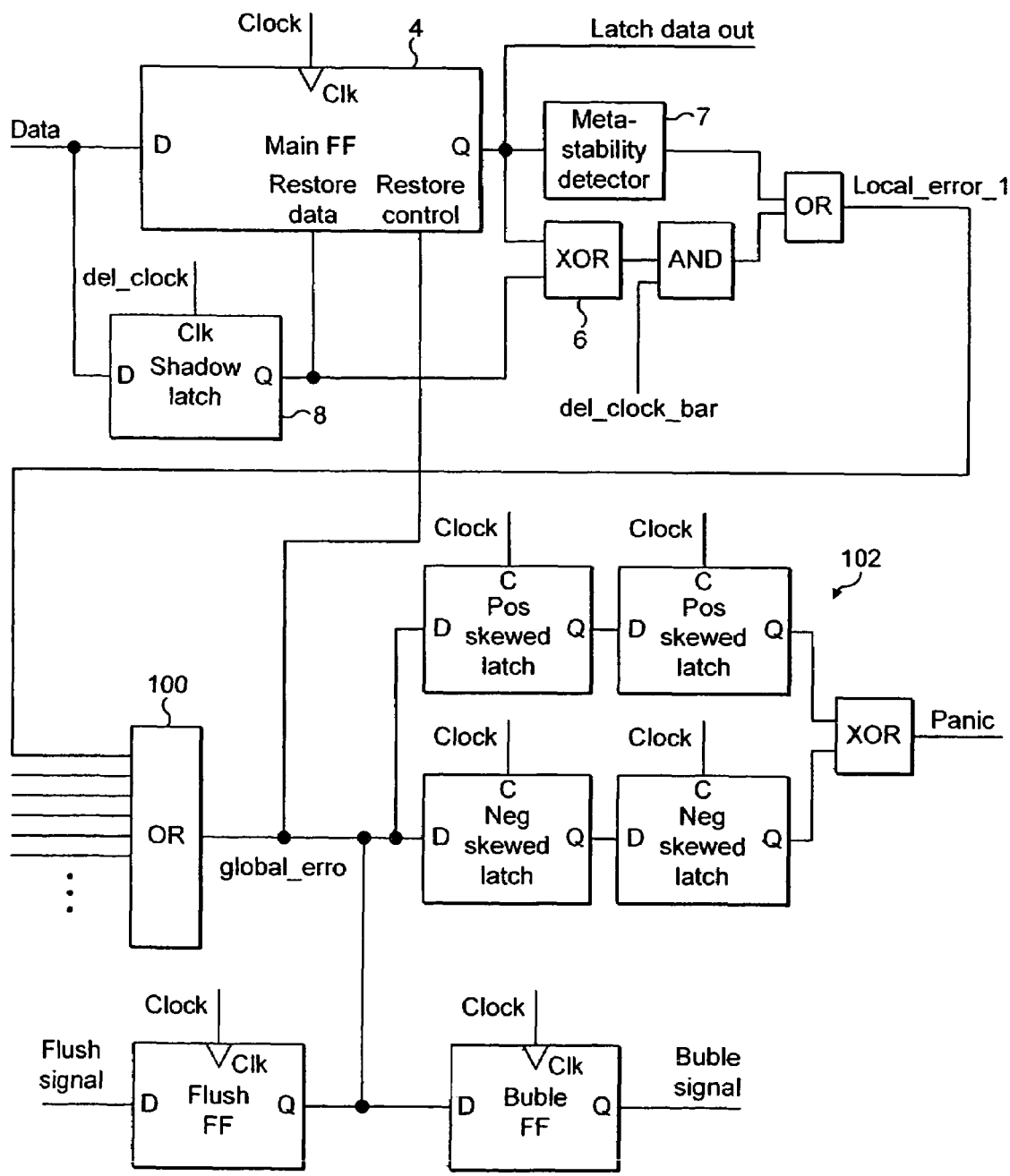
FIG. 2 is a circuit block diagram schematically illustrating a circuit for use in the present technique.

FIG. 2 is a circuit block diagram schematically illustrating a circuit for use in the present technique. The top portion of FIG. 2 illustrates circuit elements provided within each processing stage, namely the non-delayed latch 4, the delayed latch 8 and the comparator 6. A meta-stability detector 7 serves to detect meta-stability in the output of the non-delayed latch 4 and this also triggers generation of an error signal. Error signals from a plurality of such stages are supplied to respective inputs of an OR gate 100 where a global error signal is generated if an error is detected in any processor stage. The global error signal can be used to trigger flush and bubble insertion signals as illustrated. The circuits 102 detect whether the error signal itself is metastable. The error signal is latched with a positively skewed latch, referencing at a higher voltage and a negatively skewed latch, referencing at a lower voltage. If the two disagree in their latched value, this indicates that the error signal was meta-stable and the panic signal is pulled. By latching the error signal and waiting for an entire clock cycle before it sampled (i.e. two latches in series), the probability of the panic signal being meta-stable is negligible. It is significant that if the panic signal is pulled, then the restored value from the delayed latch could be corrupted due to the meta-stability of the error signal. In this case, the instruction is also invalidated and there is no forward progress. Hence flush the pipeline restart the instruction and lower the clock frequency to ensure that the error signal will not be metastable on the retry of the same instruction (which could otherwise cause an infinite loop of retries).

Figure 3:
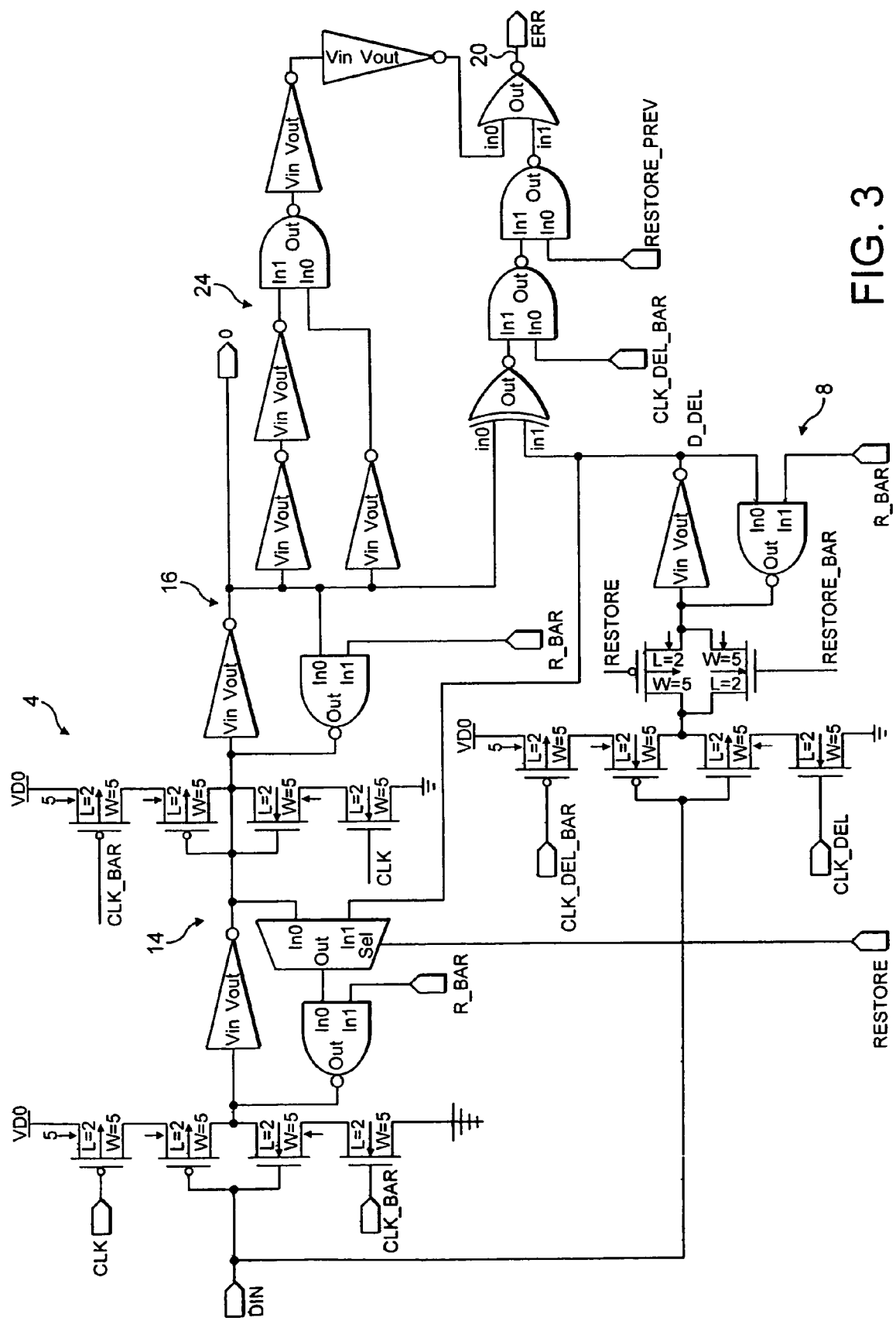
FIG. 3 is a circuit diagram schematically illustrating a non-delayed latch and a delayed latch together with an associated comparator and error-recovery logic.

FIG. 3 is a circuit illustrating in more detail the non-delayed latch, the delayed latch, the comparator and at least part of the error-recovery circuitry. The non-delayed latch 4 can be seen to be in the form of a flip-flop provided by the two latches 14, 16. The delayed latch 8 is in the form of a single feedback element. An XOR gate 18 serves as the comparator. An error signal 20 emerges from the circuit of FIG. 3 and may be supplied to the error counter circuit as previously discussed or to other operational parameter adjusting circuits or systems. The error signal 20 serves to switch a multiplexer 22 that forces the delayed value stored within the delayed latch 8 to be stored within the latch 14 of the non-delayed latch 4. meta-stability detecting circuits 24 serve to detect the occurrence of meta-stability within the non-delayed latch 4 and also use this to trigger an error signal which will cause the erroneous meta-stable value to be replaced by the delayed value stored within the delayed latch 8.

Figure 4A:
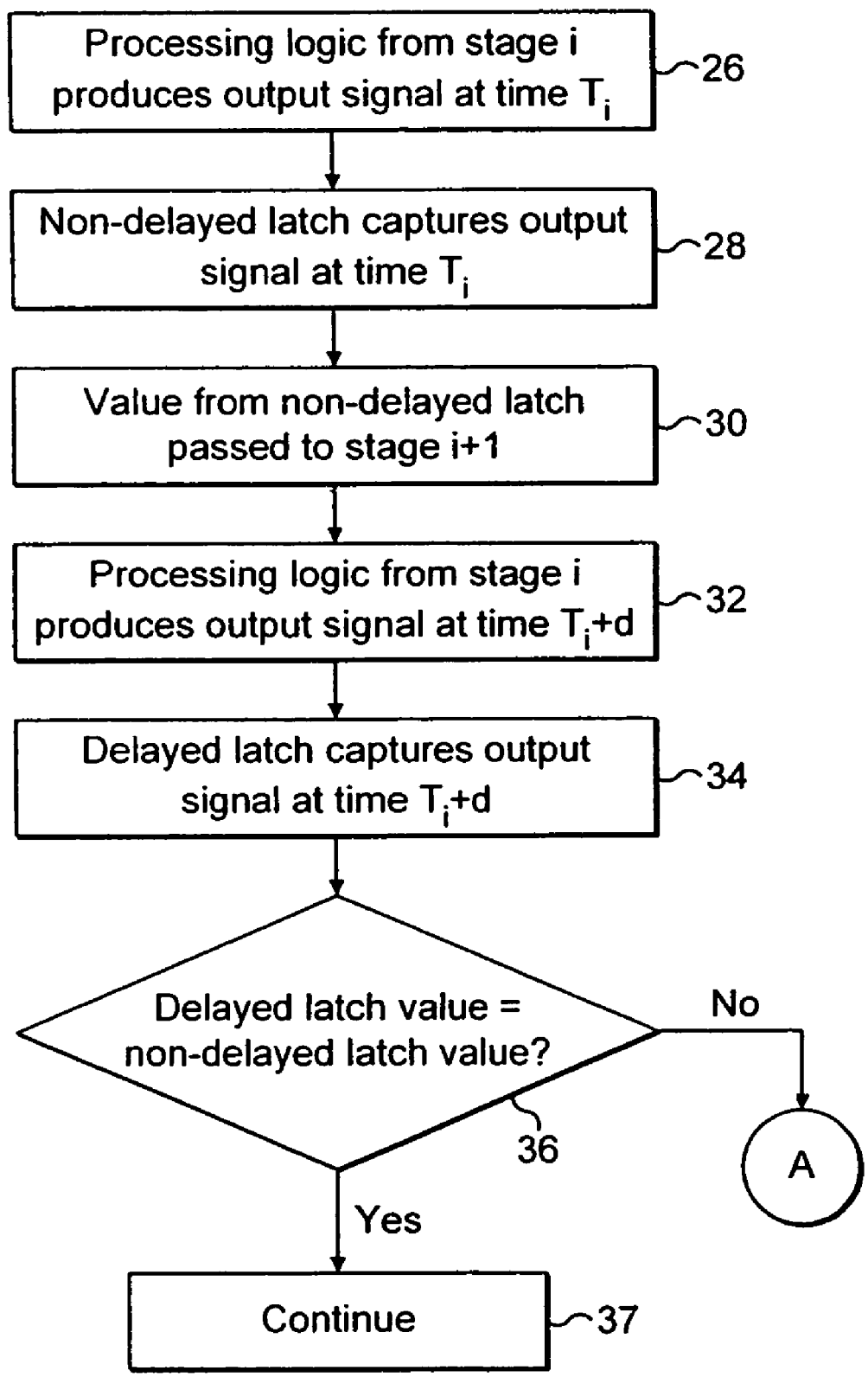
FIGS. 4A and 4B are a flow diagram schematically illustrating the operation of the circuit of FIG. 1.
Figure 4B:
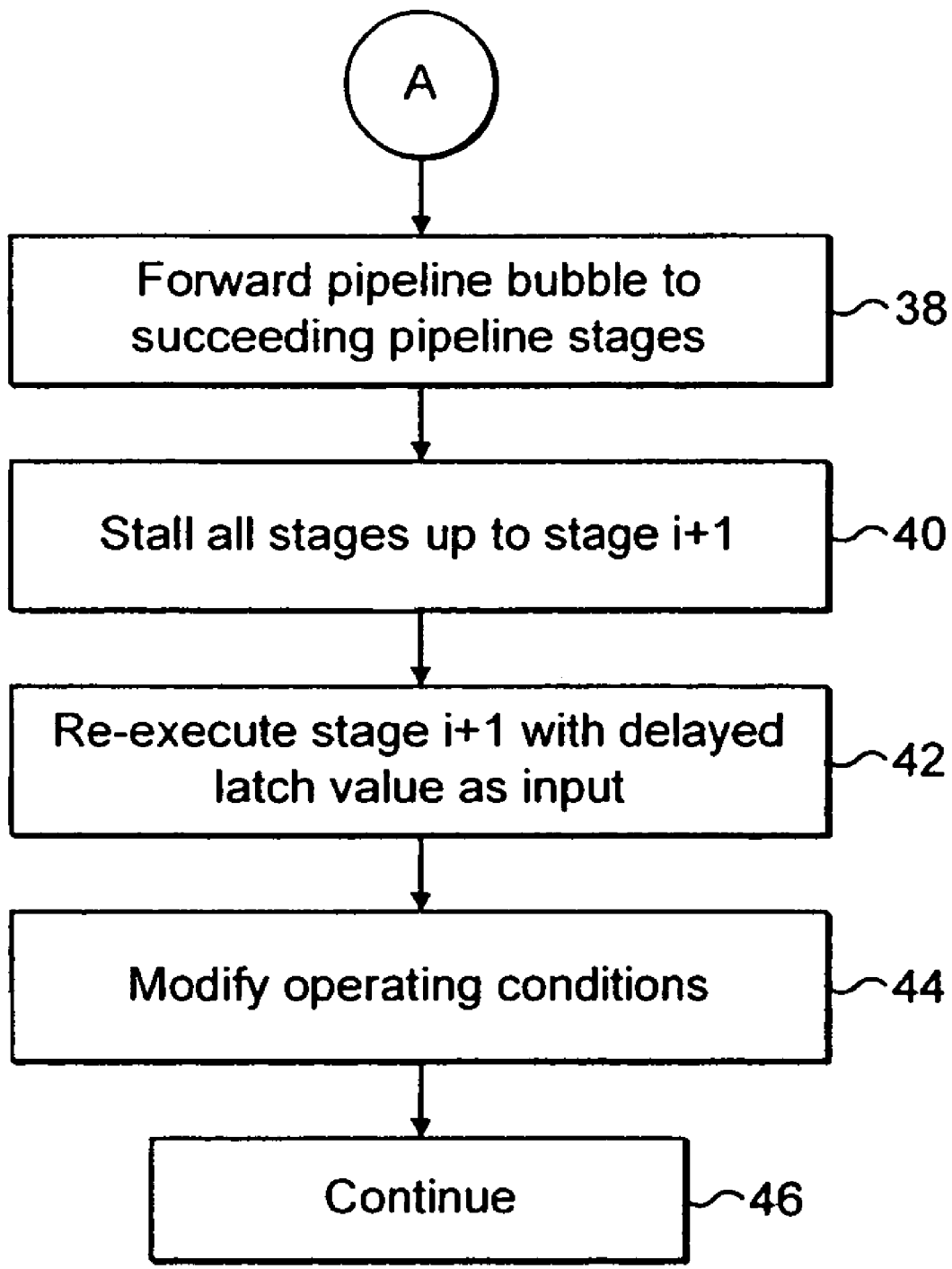

FIGS. 4A and 4B are a flow diagram schematically illustrating the operation of the circuits of FIGS. 1, 2 and 3.

At step 26 the processing logic from a stage i produces its output signal at a time $T_i$. At step 28 this is captured by the non-delayed latch and forms the non-delayed value. At step 30 the non-delayed value from the non-delayed latch starts to be passed to the following processing stage i+1 which commences processing based upon this value. This processing may turn out to be erroneous and will need recovering from should an error be detected.

Step 32 allows the processing logic to continue processing for a further time period, the delay time, to produce an output signal at time Ti+d. This output signal is latched in the delayed latch at step 34. The values within the delayed latch and the non-delayed latch are compared at step 36. If they are equal then no error has occurred and normal processing continues at step 37. If they are not equal, then this indicates that the processing logic at time $T_i$ had not completed its processing operations when the non-delayed latch captured its value and started to supply that value to the subsequent processing stage i+1. Thus, an error condition has arisen and will require correction. At step 38 this correction is started by the forwarding of a pipeline bubble into the pipeline stages following stage i. At step 40 the preceding stages to stage i+1 are all stalled. This includes the stage i at which the error occurred. At step 42, stage i+1 re-executes its operation using the delayed latch value as its input. At step 44 the operating parameters of the integrated circuit may be modified as required. As an example, the operating frequency may be reduced, the operating voltage increased, the body biased voltage increased etc. Processing then continues to step 46.

If an insufficient number of errors is detected, then the operating parameter controlling circuits and algorithms can deliberately adjust the operating parameters so as to reduce power consumption and to provoke a non-zero error rate.

Figure 5:
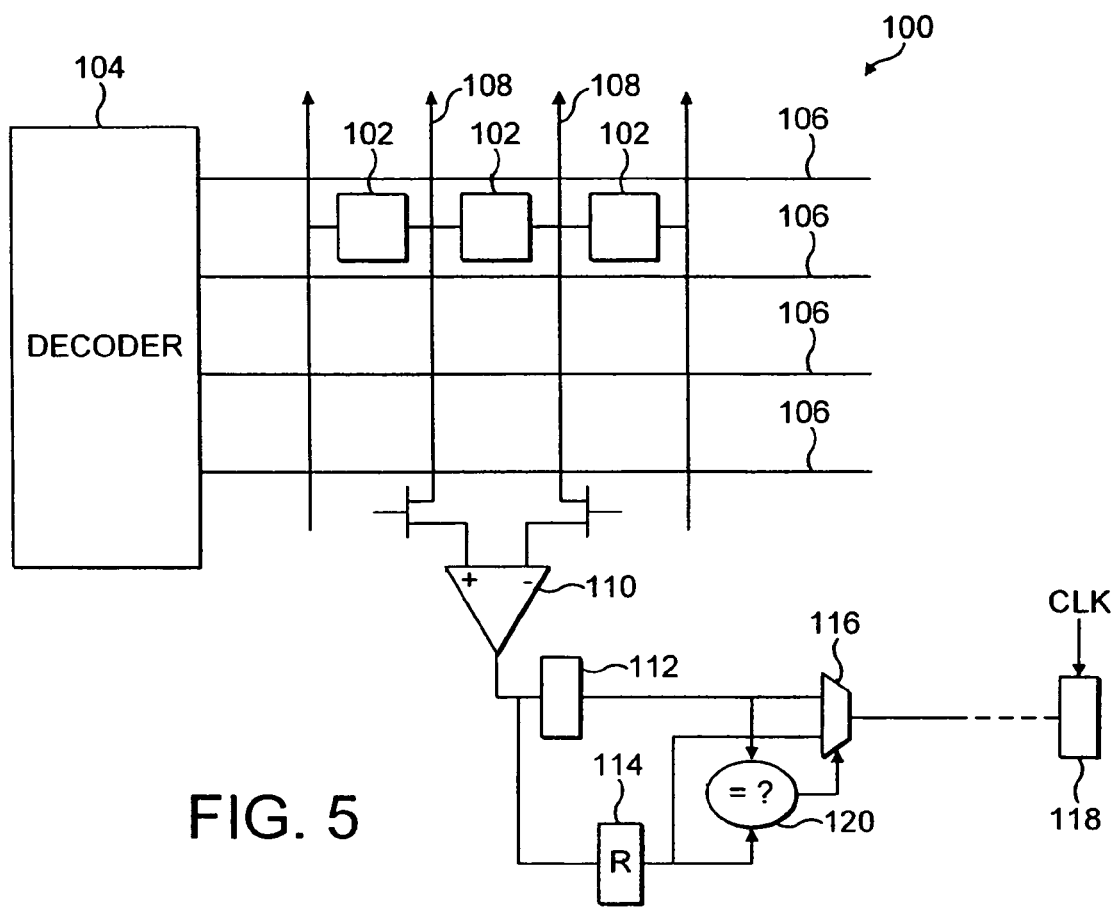
FIG. 5 schematically illustrates a memory circuit including a fast read mechanism and a slow read mechanism.

FIG. 5 illustrates a memory 100 containing an array of memory cells 102. In this example, a single row of memory cells is illustrated, but as will be familiar to those in this technical field such memory cell arrays are typically large two-dimensional arrays containing many thousands of memory cells. In accordance with normal memory operation, a decoder 104 serves to receive a memory address to be accessed and to decode this memory address so as to activate one of the word lines 106. The word lines serve to couple the memory cells 102 in that line to respective bit line pairs 108. Depending upon the bit value stored within the memory cell 102 concerned this will induce an electrical change (e.g. a change in voltage and/or a current flow) in the bit lines 108 now coupled to it and the change is sensed by a sense amplifier 110. The output of the sense amplifier 110 is stored at a first time within a non-delayed latch 112 and subsequently stored at a delayed time within a delayed latch 114. The non-delayed value stored within the non-delayed latch 112 is directly passed out via a mutliplexer 116 to a further processing circuit 118 before the delayed value has been stored into the delayed latch 114. When the delayed value has been captured within the delayed latch 114, a comparator 120 serves to compare the non-delayed value and the delayed value. If these are not equal, then the delayed value is switched by the multiplexer 116 to being the output value from the memory 100 for the particular bit concerned. A suppression signal is also issued from the comparator 120 to the further processing circuit 118 to suppress processing by that further processing circuit 118 based upon the erroneous non-delayed value which has now been replaced. This suppression in this example takes the form of controlling the clock signal CLK supplied to the further processing circuit 118 to stretch the clock cycle concerned and to delay latching of the new result by that further processing circuit until a time when the delayed value has had a chance to propagate through the processing circuit concerned to reach the latch at the output of that further processing circuit.

It will be seen that the sense amplifier 110 and the non-delayed latch 112 form part of the fast read mechanism. The sense amplifier 110 and the delayed latch 114 form part of the slow read mechanism. In most cases, the fast read result latched within the non-delayed latch 112 will be correct and no corrective action is necessary. In a small number of cases, the fast read result will differ from the slow read result latched within the delayed latch 114 and in this circumstance the slow read result is considered correct and serves to replace the fast read result with processing based upon that fast read result being suppressed. The penalty associated with a relatively infrequent need to correct erroneous fast read results is more than compensated for by the increased performance (in terms of speed, lower voltage operation, lower energy consumption and/or other performance parameters) that is achieved by running the memory 100 closer to its limiting conditions.

Figure 6:
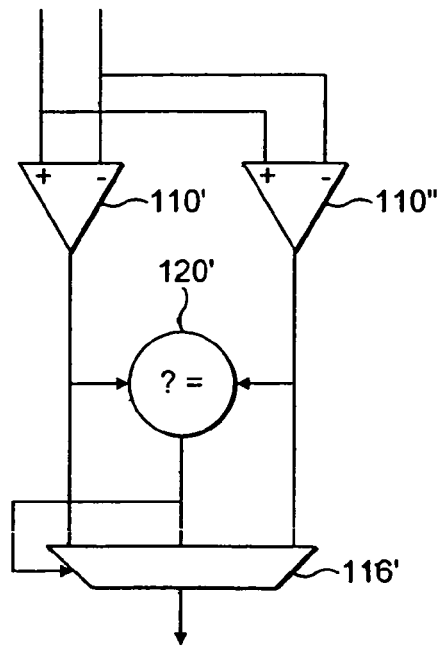
FIG. 6 illustrates an alternative circuit arrangement for a portion of the circuit of FIG. 5.

FIG. 6 illustrates a variation in part of the circuit of FIG. 5. In this variation two sense amplifiers 110', 110" are provided. These different sense amplifiers 110', 110" are formed to have different speeds of operation with one 110' being relatively fast and less reliable and the other 110" being relatively slow and more reliable. These different characteristics can be achieved by varying parameters of the sense amplifier 110', 110", e.g. construction parameters such as transistor size, doping levels, gain etc. A comparator 120' serves to compare the two outputs. The output from the fast sense amplifier 110' is normally passed out via the multiplexer 116' prior to the output of the slow sense amplifier 110" being available. When the output of the slow sense amplifier 110" is available and the comparator 120 detects this is not equal to the output of the fast sense amplifier 110', then it controls the multiplexer 116' to switch the output value to be that generated by the slow sense amplifier 110". The comparator 120 also triggers generation of a suppression signal such that downstream processing based upon the erroneous fast read result is suppressed.

Figure 7:
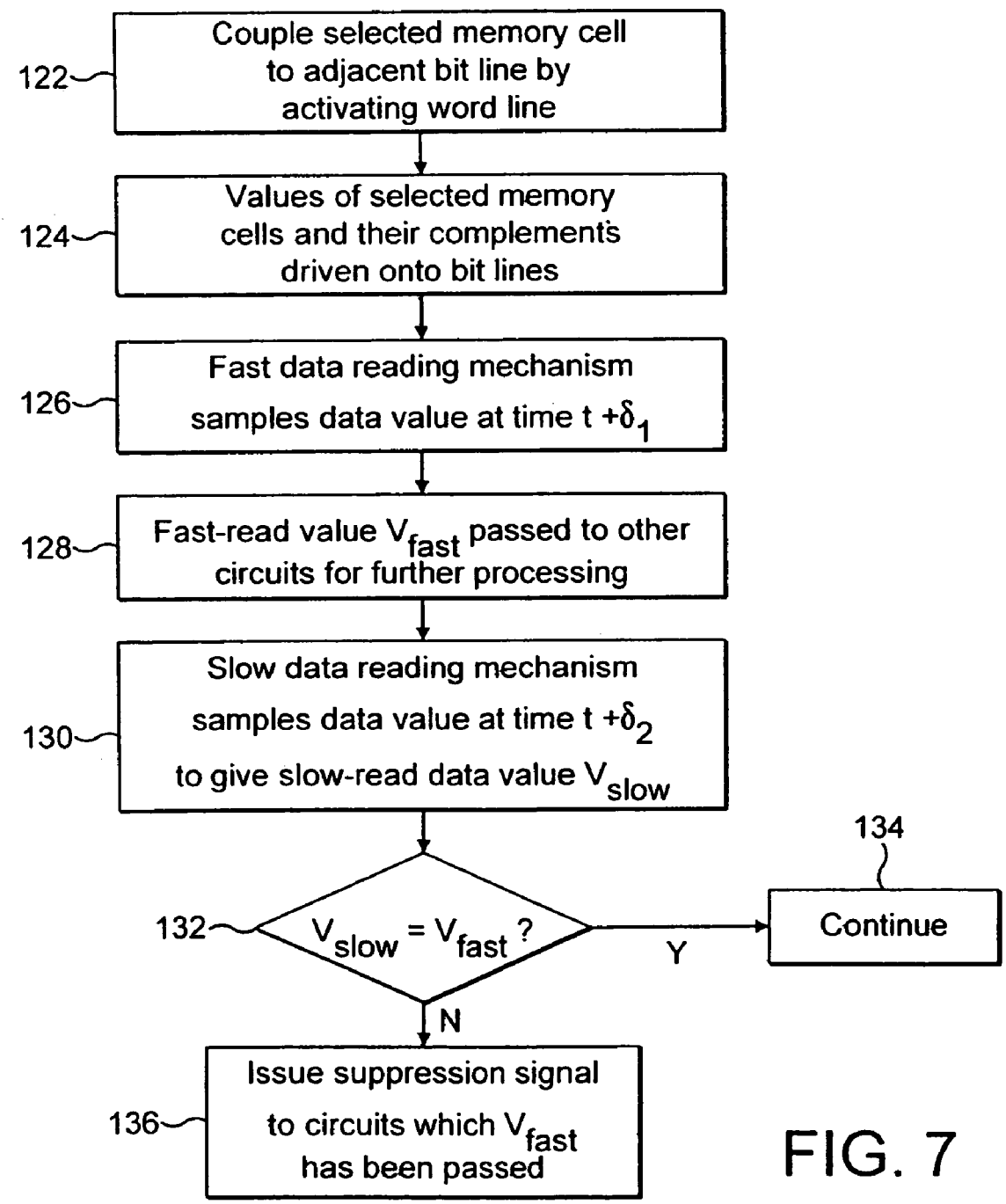
FIG. 7 is a flow diagram schematically illustrating the operation of the memory circuit of FIG. 5.

FIG. 7 is a flow diagram illustrating the operation of the circuit of FIG. 5. At step 122, an address is decoded resulting in respective memory cells being coupled to their adjacent bit lines using a signal passed by a word line. At step 124, the bit values stored within the selected memory cells and their complements and driven onto the bit line pairs. This causes current flows- within the bit lines and voltage changes in the bit lines. The sense amplifiers 110 are responsive to detected currents and/or voltage level changes.

At step 126, the fast data read mechanism samples the value being output from the memory cell at that time. At step 128 this fast read data value is passed to subsequent processing circuits for further processing upon the assumption that it is correct. At step 130, the slow data reading mechanism samples a slow read data value. Step 132 compares the fast read value and the slow read value. If these are the same, then normal processing continues at step 134. However, if the sampled values are different, then step 136 serves to issue a suppression signal to the further circuits to which the fast read value has been passed and also to issue the slow read value in place of the fast read value to those further circuits such that corrective processing may take place.

Figure 8:
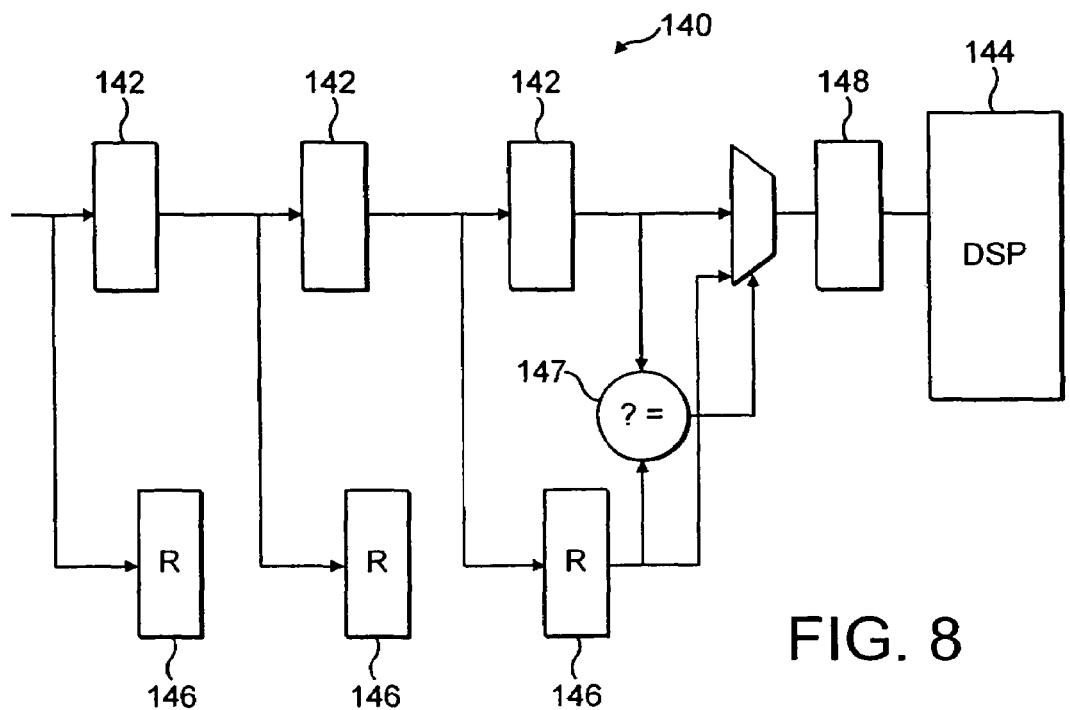
FIG. 8 illustrates a pipelined bus including non-delayed latches and delayed latches between the bus stages.

FIG. 8 illustrates the use of the present techniques within a pipelined bus 140. The pipelined bus 140 contains a number of latches 142 which serve to store data values being passed along the bus. As an example of such a pipelined bus 140 there is known the AXI buses designed by ARM Limited of Cambridge, England. In this arrangement the destination for the data value being passed along the pipelined bus 140 is a digital signal processing circuit 144. This digital signal processing (DSP) circuit 144 does not in itself implement the non-delayed latching and delayed latching techniques discussed previously. In alternative arrangements the destination for the data value being passed along the pipelined bus could be a device other than a DSPcircuit, for example, a standard ARM processor core that does not itself implement the delayed and non-delayed latching techniques.

Associated with each of the non-delayed latches 142 is a respective delayed latch 146. These delayed latches 146 serve to sample the signal value on the bus at a time later than when this was sampled and latched by the non-delayed latch 142 to which they correspond. Thus, a delay in the data value being passed along the bus for whatever reason (e.g. too low an operational voltage being used, the clock speed being too high, coupling effects from adjacent data values, etc) will result in the possibility of a difference occurring between the values stored within the non-delayed latch 142 and the delayed latch 146. The final stage on the pipeline bus 140 is illustrated as including a comparator 147 which compares the non-delayed value and the delayed value. If these are not equal, then the delayed value is used to replace the non-delayed value and the processing based upon the non-delayed value is suppressed such that the correction can take effect (the bus clock cycle may be stretched). It will be appreciated that these comparator and multiplexing circuit elements will be provided at each of the latch stages along the pipeline bus 140, but these have been omitted for the sake of clarity from FIG. 8.

As the DSP circuit 144 does not itself support the non-delayed and delayed latching mechanism with its associated correction possibilities, it is important that the data value which is supplied to the DSP circuit 144 has been subject to any necessary correction. For this reason, an additional buffering latch stage 148 is provided at the end of the pipelined bus 140 such that any correction required to the data value being supplied to that latch and the attached DSP circuit 144 can be performed before that data value is acted upon by the DSP circuit 144. The buffering latch 148 can be placed in sufficient proximity to the DSP circuit 144 that there will be no issue of an insufficient available progation time etc. causing an error in the data value being passed from the buffering latch 148 to the DSP circuit 144.

It will be appreciated that the bus connections between the respective non-delayed latches 142 can be considered to be a form of processing logic that merely passes the data unaltered. In this way, the equivalence between the pipelined bus embodiment of FIG. 8 and the previously described embodiments (e.g. FIG. 1) will be apparent to those familiar with this technical field.

Figure 9:
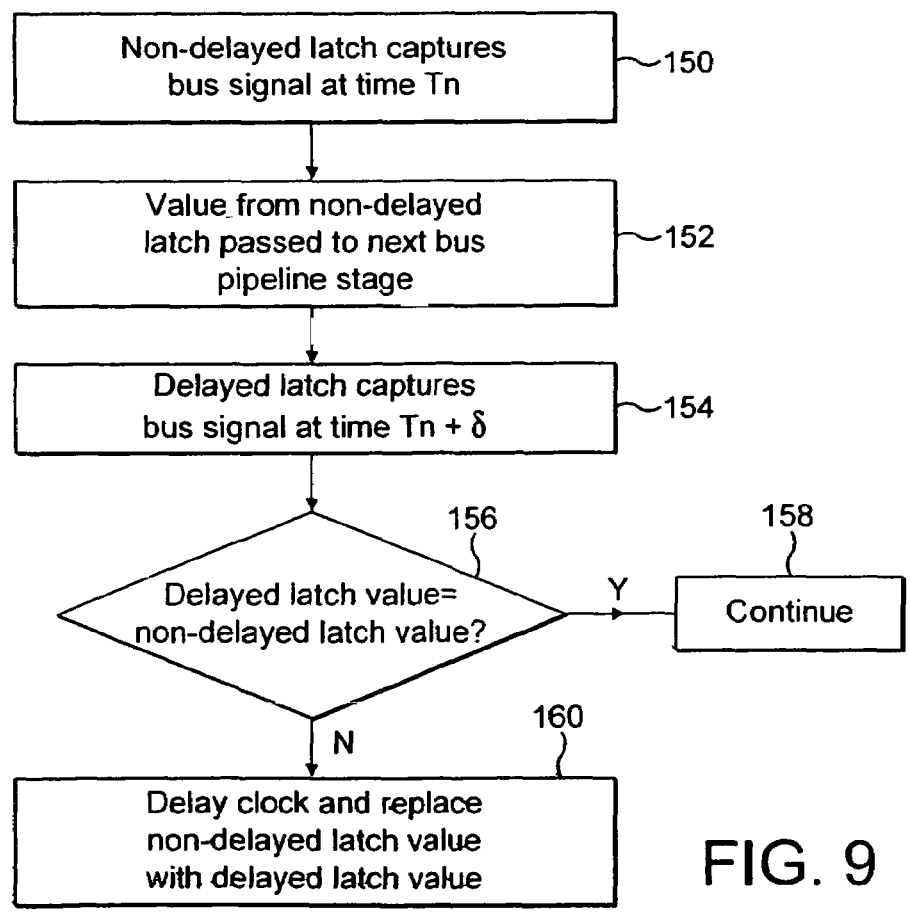
FIG. 9 is a flow diagram schematically illustrating the operation of the pipelined bus of FIG. 8.

FIG. 9 is a flow diagram illustrating the operation of FIG. 8. At stage 150 a non-delayed signal value is captured from the bus line. At step 152 the non-delayed value is then passed to the next bus pipeline stage. At step 154 the corresponding delayed latch 146 captures a delayed bus signal. At step 156 the comparator 147 compares the delayed value with the non-delayed value. If these are equal, then normal processing continues at step 158. If the two compared values are not equal, then step 160 serves to delay the bus clock and replace the non-delayed value with the delayed value using the multiplexer shown in FIG. 8.

Figure 10:
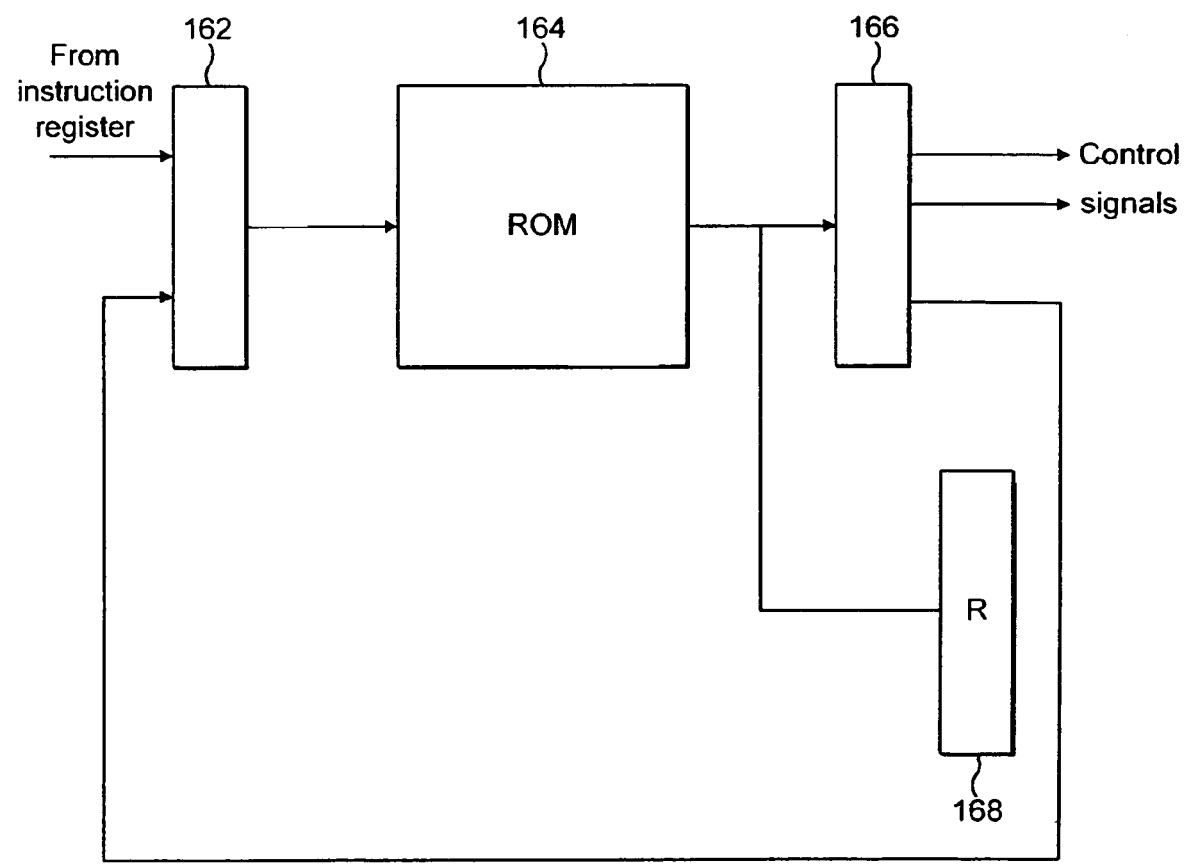
FIG. 10 schematically illustrates the generation of control signals for controlling a microprocessor that are subject to both non-delayed latching and output and delayed latching and output.

FIG. 10 illustrates a further example embodiment using the present techniques. In this example embodiment an instruction from an instruction register within a processor core is latched within an instruction latch 162. From this instruction latch 162, the instruction is passed to a decoder 164 which includes a microcoded ROM serving to generate an appropriate collection of processor control signals for storage in a non-delayed control signal latch 166 and subsequent use to control the processing performed by the processor core in accordance with the instruction latched within the instruction latch 162. The control signals output from the decoder 164 are also latched within a delayed control signal latch 168 at a later time to when they were latched within the non-delayed control signal latch 166. The delayed control signal values and the non-delayed control signal values can then be compared. If these are not equal, then this indicates that corrective action is necessary. A suppression operation is triggered by the detection of such a difference and serves to stop subsequent processing based upon the inappropriate latch control signal values. It may be that in some circumstances the only effective recovery option is to reset the processor as a whole. This may be acceptable. In other situations, the error in the control signals might be such that a less drastic suppression and recovery mechanism is possible. As an example, the particular erroneous control signal may not yet have been acted upon, e.g. in the case of a multi-cycle program instruction where some processing operations do not commence until late in the overall execution of the multi-cycle instruction. An example of this is a multiply-accumulate operation in which the multiply portion takes several clock cycles before the final accumulate takes place. If there is an error in the control signal associated with the accumulate and in practice an accumulate is not required, but merely a pure multiply, then it would be possible to suppress the accumulate by correcting the control signal being applied to the accumulator before the adder had sought to perform the accumulate operation.

Figure 11:
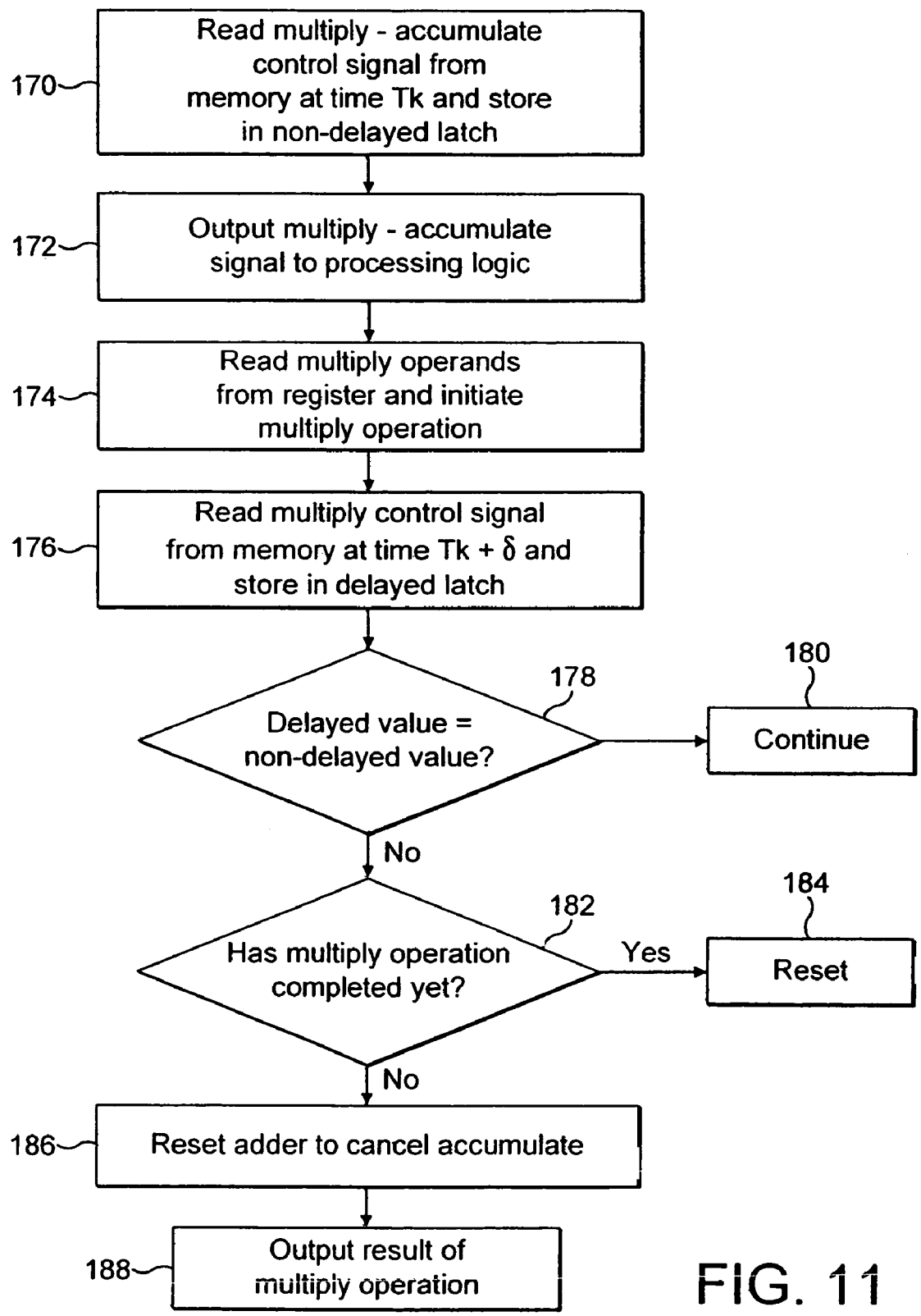
FIG. 11 is a flow diagram schematically illustrating one example of the operation of the circuit of FIG. 10.

FIG. 11 illustrates one example of the operation of the circuit of FIG. 10. At step 170, a multiply-accumulate control signal is read from the decoder 164 (microcoded ROM). At step 172, this multiply-accumulate control signal is latched within the non-delayed control signal latch 166 and output to the various processing elements within the processor core. At step 174, the multiply operands are read from the register file and the multiply operation is initiated. At step 176, the control signals output by the instruction decoder 164 are re-sampled by the delayed control signal latch 168. At step 178, the non-delayed control signals and the delayed control signals are compared. If these are equal, then normal processing continues at step 180. However, if these are not equal, then processing proceeds to step 182 where a determination is made as to whether the multiply operation has yet completed. If the multiply operation has completed, then the erroneous accumulate operation will have started and the best option for recovery is to reset the system as a whole at step 184. However, if the multiply operation is still in progress, then step 186 can be used to reset the adder and cancel the accumulate operation with the desired multiply operation output result being generated at step 188, as was originally intended by the program instruction stored within the instruction latch 162.

Figure 12:
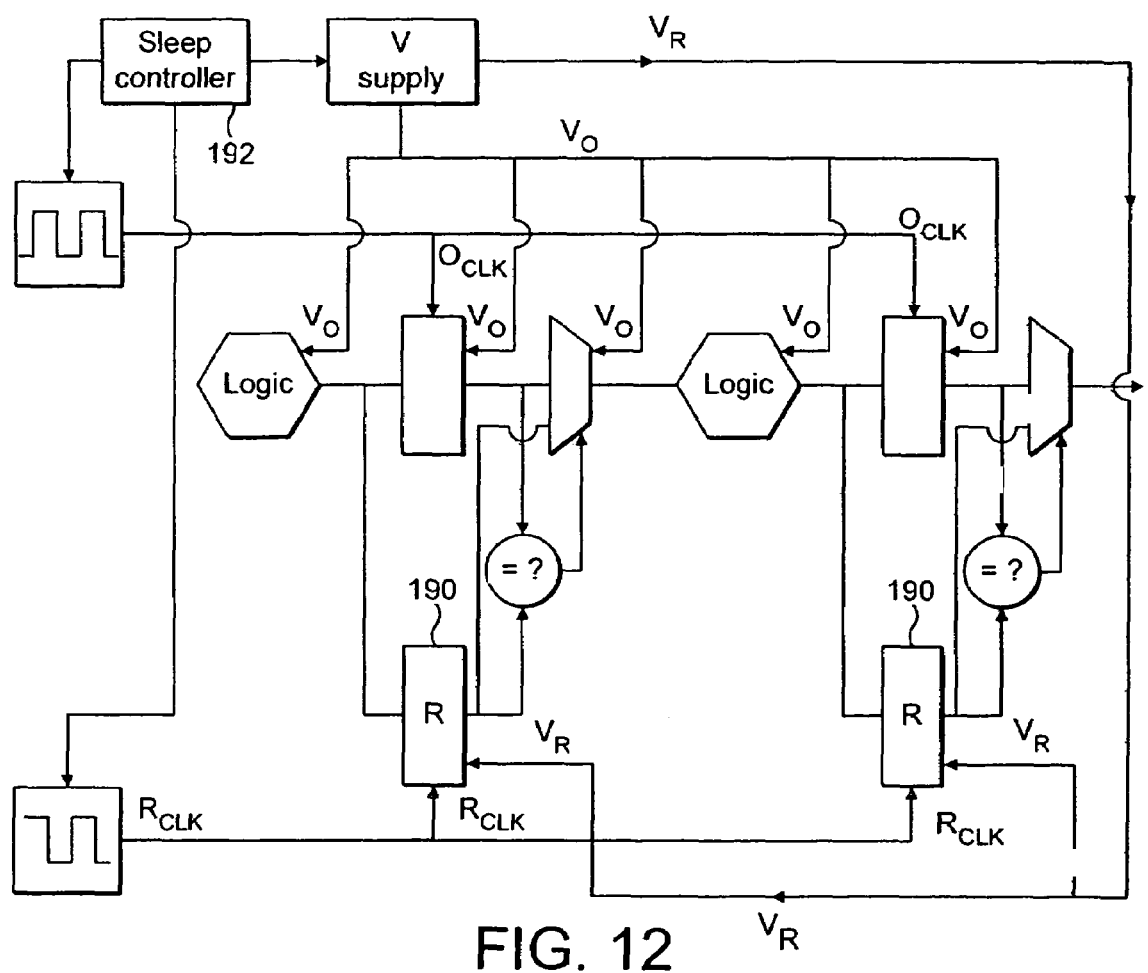
FIG. 12 illustrates a processing pipeline including non-delayed latches and delayed latches with those delayed latches being reused as data retention latches during a lower power of operation.

FIG. 12 illustrates a modification of the circuit illustrated in FIG. 1. In this embodiment the delayed latches 190 serve the additional function of data retention (balloon) latches for use during a standby/sleep mode of operation (low power consumption mode). The function of the delayed latches 190 during normal processing operations is as previously described. However, when a sleep controller 192 serves to initiate entry into a low power consumption mode of operation it stops the non-delayed clock and the delayed clock such that the delayed latches 190 are all storing data values corresponding to their respective non-delayed latches. At this point, the voltage supply to the non-delayed latches and the associated processing circuits is removed such that they are powered down and lose their state. However, the voltage supplied to the non-delayed latches 190 is maintained such that they serve to retain the state of the processing circuit concerned. When the system exits from the low power consumption mode, the processing logic and the non-delayed latches are powered up again when the comparator detects a difference in the values in the non-delayed latch and the delayed latch 190 it triggers replacement of the erroneous value within the non-delayed latch with the correct value held within the associated delayed latch 190. It will be appreciated that since the delayed latches 190 are subject to less stringent timing requirements than their non-delayed counterparts they can be formed in a way where they may have a lower speed of operation but be better suited to low power consumption during the low power consumption mode (e.g. high threshold voltages resulting in slower switching but with a reduced leakage current). In this way, the error correcting delayed latches which are used during normal processing can be reused during the low power consumption mode as data retention latches thereby advantageously reducing the overall gate count of the circuit concerned.

Figure 13:
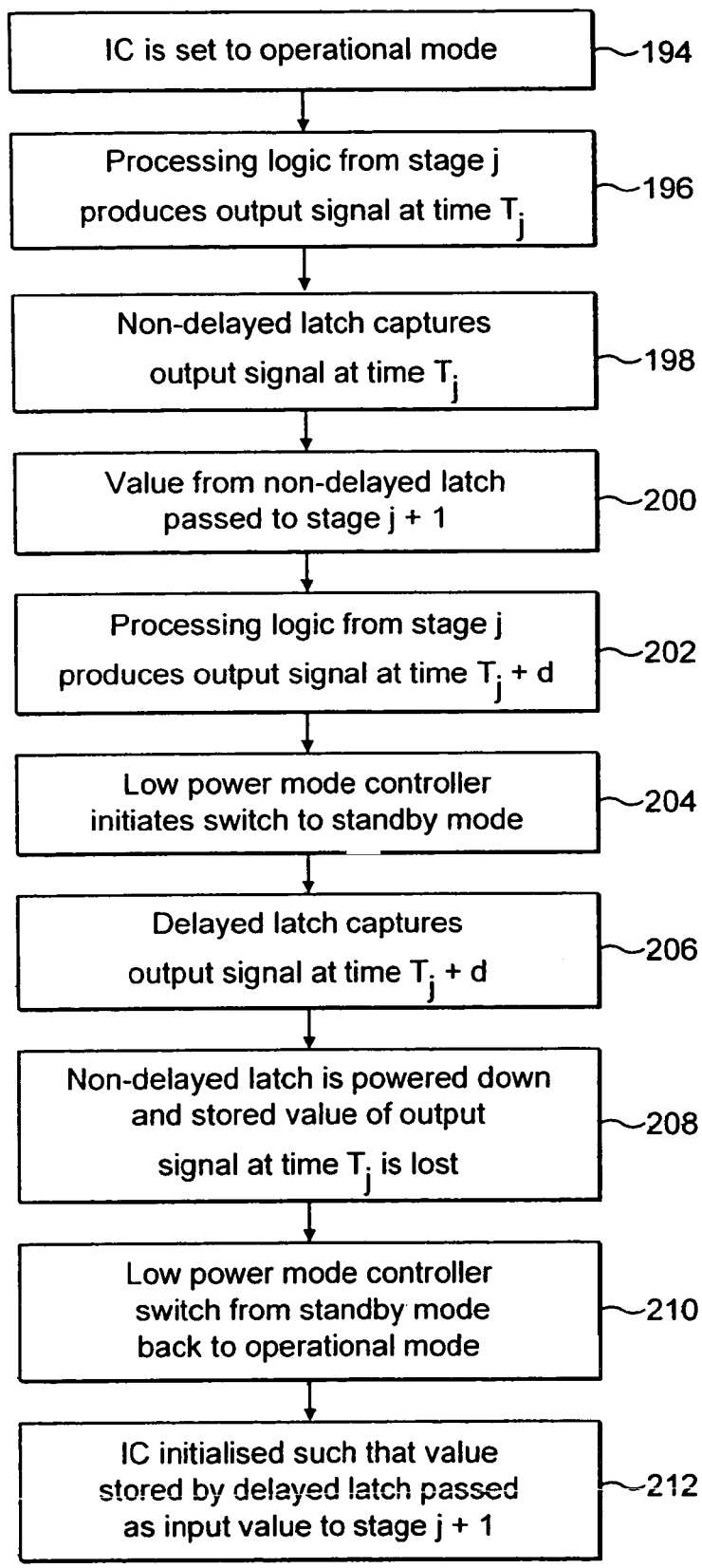
FIG. 13 is a flow diagram schematically illustrating the operation of the circuit of FIG. 12.

FIG. 13 is a flow diagram schematically illustrating the operation of the circuit of FIG. 12. At step 194, the integrated circuit is in its normal operational processing mode. At step 196, the processing logic stage produces an output signal at a non-delayed time. At step 198, the non-delayed latch captures that output signal. At step 200 the non-delayed signal within the non-delayed latch is passed to the next processing stage. At step 202, the output from the processing stage at a delayed time is generated and is available for capture by the delayed latch. At step 204, the integrated circuit is triggered to adopt a low power consumption mode and the speed controller 192 serves to initiate the power down of the processing circuits while maintaining the power to the delayed latches 190. At step 206, the delayed latch 190 captures the delayed signal value. It may be that the capture of the delayed signal value by the delayed latch at step 206 takes place before the switch to the low power mode at step 204. At step 208, the non-delayed latch is powered down and its stored value is lost. The integrated circuit can remain in this state for a long period of time. When desired, step 210 triggers the sleep controller 192 to exit the low power consumption mode and revert back to the operational mode. At step 212, power is restored to the non-delayed latches and the associated processing logic with the delayed data values within the delayed latches 190 being used to repopulate the pipeline stages as necessary to restore the system to its condition prior to the low power consumption mode being entered.

Figure 14:
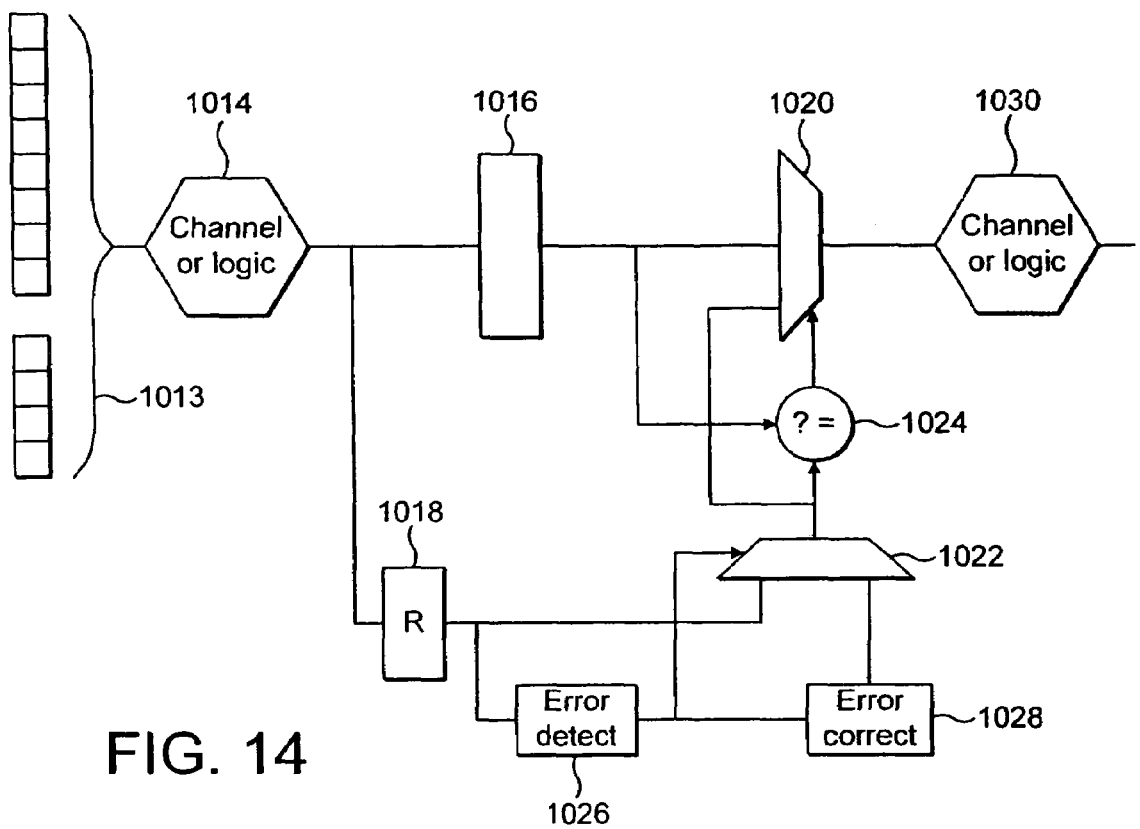
FIG. 14 schematically illustrates a plurality of processing stages to which error correction and delayed latches have been applied.

FIG. 14 schematically illustrates a plurality of processing stages to which error correction control and delayed latches have been applied. The processing stages form part of an integrated circuit that may be part of a synchronous pipeline within a processor core, part of a communication bus or part of a memory system. The first processing stage comprises either a channel for communication of data or processing logic 1014, a non-delayed latch 1016, a delayed latch 1018, a comparator 1024 that compares outputs of the delayed latch and the non-delayed latch and outputs a control signal to a multiplexer 1020 determining whether the delayed signal value or the non-delayed signal value is supplied as input to a subsequent processing stage or channel 1016. The channel/logic 1014 and the non-delayed latch 1016 are driven by a non-delayed clock signal whereas the delayed latch 1019 is driven by a delayed clock signal which is a phase-shifted version of the non-delayed clock signal.

If the comparator 1024 detects a difference between the non-delayed signal value and the delayed signal value this indicates that either the processing operation was incomplete at the non-delayed capture time in the case that element 1014 represents processing logic or that the signal from the previous pipeline stage had not yet reached the present stage in the case of the element 1014 representing a data channel. In the event that such a difference is in fact detected, the value stored in the delayed latch 1018 is the more reliable data value since it was captured later when the processing operation is more likely to have been completed or the data from the previous stage is more likely to have arrived via the data channel. By supplying the result from the delayed latch to the next processing stage 1030 and suppressing use of the non-delayed value in subsequent processing stages, forward progress of the computation can be ensured. However, the reliability of the delayed signal value stored in the delayed latch 1018 can be compromised in the event that a single event upset occurred and corrupted the delayed value. The single event upset is effectively a pulse so it may well be missed by the non-delayed latch but picked up by the delayed latch. Such a single event upset will result in the comparator detecting a difference between the delayed and non-delayed values as a direct result of the single event upset and will then propagate the corrupted delayed value to subsequent processing stages. A single event upset that corrupts the non-delayed value will not be problematic since it will result in suppressing use of the erroneous non-delayed value and propagating the delayed value to subsequent stages.

The arrangement of FIG. 14 reduces the likelihood of a corrupted delayed value progressing through the computation by providing a cross-check of data integrity by provision of an error detection module 1026, an error correction module 1028 and a multiplexer 1022 that is controlled by the error detection module 1026 to supply either the delayed value from the delayed latch directly to the comparator 1024 or alternatively to supply an error corrected value output by the error correction module 1028. Upstream of the channel/logic unit 1014 a data payload of eight bits is error correction encoded and four redundancy bits are added to the data payload to form a twelve-bit signal. The twelve-bit signal passes through the channel/logic unit 1014 and its value is captured by both the non-delayed latch 1016 and the delayed latch 1018. However, a delayed value of the signal derived from the delayed latch 1018 is also supplied as input to the error detection module 1026, which determines from the 12-bit error-correction encoded signal whether any errors have occurred that affect the delayed value. In an alternative arrangement a further latch could be provided to supply a signal value to the error detection module 1018, that captures the signal value at a time slightly later than the delayed latch 1018. The error-checking must be performed on a value captured at the same time as the delayed value is captured or slightly later to ensure that any random error that occurred between capture of the non-delayed value and capture of the delayed value is detected.

A given error correction code is capable of detecting a predetermined number of errors and of correcting a given number of errors. Thus the error detection module 1026 detects whether any errors have occurred and, if so, if the number of errors is sufficiently small such that they are all correctable. If correctable errors are detected then the signal value is supplied to the error correction module 1028 where the errors are corrected using the error correction code and the corrected delayed value is supplied to the comparator 1024. If it is determined by the comparator 1024 that the corrected delayed value differs from the non-delayed value then the error recovery procedure is invoked so that further propagation of the non-delayed value is suppressed in subsequent processing stages and the operations are instead performed using the corrected delayed value. On the other hand, if the comparator 1024 determines that the corrected delayed value is the same as the delayed value then there are two alternative possibilities for progressing the calculation. Firstly, the error recovery mechanism could nevertheless be invoked so that the non-delayed value is suppressed in subsequent processing stages and replaced by the corrected delayed value. Alternatively, since the non-delayed value is determined to have been correct (as evidenced by the equality of the non-delayed value and the corrected delayed value), the error recovery mechanism could be suppressed (despite the detection of an error in the delayed value) thus allowing the non-delayed value to continue to progress through the subsequent processing stages. However, if uncorrectable errors are detected in the delayed value by the error detection module 1026 then a control signal is supplied to suppress use of the corrupted delayed value. In this case forward progress of the computation cannot be achieved. The type of error correction encoding applied differs according to the nature of the channel/processing logic 1014.

Processing logic can be categorised as either value-passing or value-altering. Examples of processing logic that is value-passing are memory, registers and multiplexers. Examples of value-altering processing logic elements are adders, multipliers and shifters. Error detection and correction for value-altering processing logic elements is more complex than for value-passing processing logic elements because even when no error has occurred the value output by the logic stage 1014 is likely to be different from the input twelve-bit signal 1013.

Figure 15:
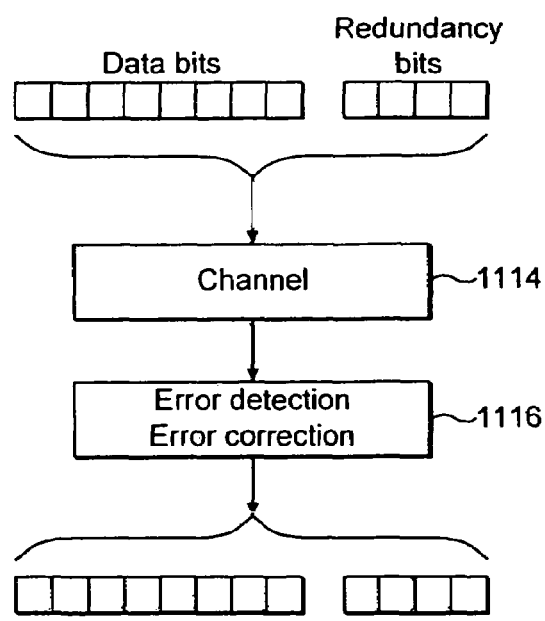
FIG. 15 schematically illustrates error correction for data passing through a channel that simply passes the data value unchanged from input to output if no errors occur.

FIG. 15 schematically illustrates error correction for data passing through a channel that simply passes the data value unchanged from input to output if no errors occur. In the case of such value-passing processing logic it is convenient to use a linear block code such as a Hamming code for error correction and detection. Linear block codes typically involve forming a codeword in which the original data payload bits remain in the codeword unchanged but some parity bits (or redundancy bits) are added. Hamming codes are simple single-bit error correction codes and for an (N, K) code, N is the total number of bits in the codeword and K is the number of data bits to be encoded. The presence and location of an error is detected by performing a number of parity checks on the output codeword. The Hamming code comprises N-K parity bits, each of which is calculated from a different combination of bits in the data. Hamming codes are capable of correcting one error or detecting two errors. The number of parity bits (or redundancy bits required is given by the Hamming rule $K+p+1 \leq 2^p$, where p is the number of parity bits and $N=K+p$.

As illustrated in FIG. 15 input to the channel is a 12 bit codeword comprising eight data bits and four parity or redundancy bits. Parity checks are performed by an error detection/correction module 1116 on the output from the channel 1114. Any single-bit error in the 12-bit codeword is detected and corrected prior to output of the codeword by the error detection/correction module 1116. If detected errors are uncorrectable the error detection/correction module 1116 outputs a signal indicating that this is the case. Although simple codes such as Hamming codes have been described in relation to FIG. 11 for use with value-passing processing logic, it will be appreciated that other error correction codes such as convolutional codes could alternatively be used.

Figure 16:
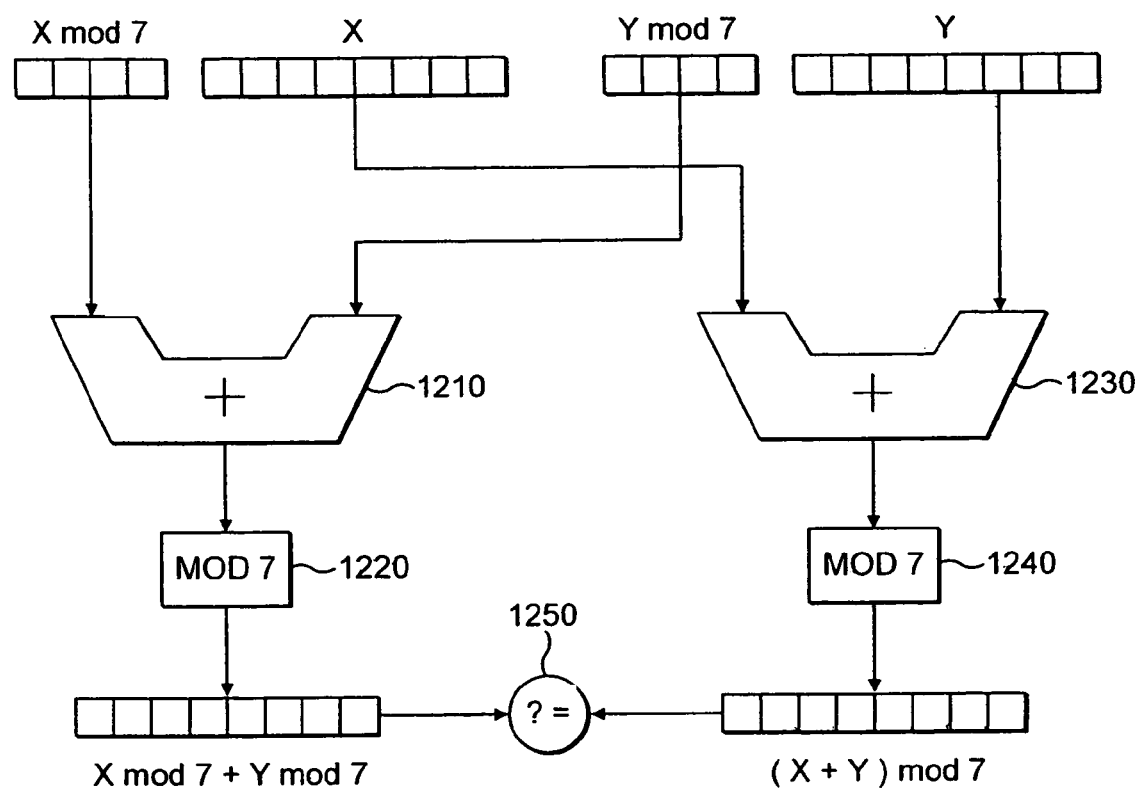
FIG. 16 schematically illustrates how error correction is performed for a value-changing logic element such as an adder, multiplier or shifter.

FIG. 16 schematically illustrates how error correction is performed for a value-changing logic element such as an adder, multiplier or shifter. In the case of value-altering processing logic arithmetic codes such as AN codes, residue codes, inverse residue codes or residue number codes may be used to detect and correct random errors in the output of the processing logic.

Arithmetic codes can be used to check arithmetic operators. Where $\otimes$ represents the operator to be checked the following relation must be satisfied:

$$\text{Code}(X \otimes Y) = \text{code } X \otimes \text{code } Y$$

AN codes are arithmetic codes that involve multiplying the data word by a constant factor, for example a 3N code can be used to check the validity of an addition operation by performing the following comparison:

$$3N(X)+3N(Y)?=3N(X+Y)$$

$$3X+3Y?=3(X+Y).$$

A further example of a class of arithmetic codes are residue codes, in which a residue (remainder of division by a constant) is added to the data bits as check bits e.g. a 3R code involves modulo (MOD) 3 operations and the following check is applied:

$$X\text{ MOD }3 + Y\text{ MOD }3? = (X+Y)\text{ MOD }3$$

Consider the numerical example of X=14 and Y=7:
14 MOD 3=2 (codeword 111010, with last two bits as residue);
7 MOD 3=1 (codeword 011101);
X+Y=21 (10101);
and 21 MOD 3=0;
sum of residues MOD 3=(2+1) MOD 3=0=residue of (X+Y).

FIG. 16 schematically illustrates use of a 7R arithmetic code for checking of an addition operation in the channel/logic units 1014 of FIG. 10. The addition operation to be checked is X+Y, where X and Y are eight-bit data words. Each data word has a four check bits having values X MOD 7 and Y MOD 7 respectively. X MOD 7 and Y MOD 7 are supplied as operands to a first adder 1210 and the output of this adder is supplied to logic that determines the value (X MOD 7+Y MOD 7) MOD 7 and supplies the result as a first input to a comparator 1250. A second adder 1230 performs the addition (X+Y), supplies the result to a logic unit 1240 that calculates (X+Y) MOD 7 and supplies the result as a second input to the comparator 1250. If the comparator detects any difference between the two input values then an error has occurred.

Figure 17:
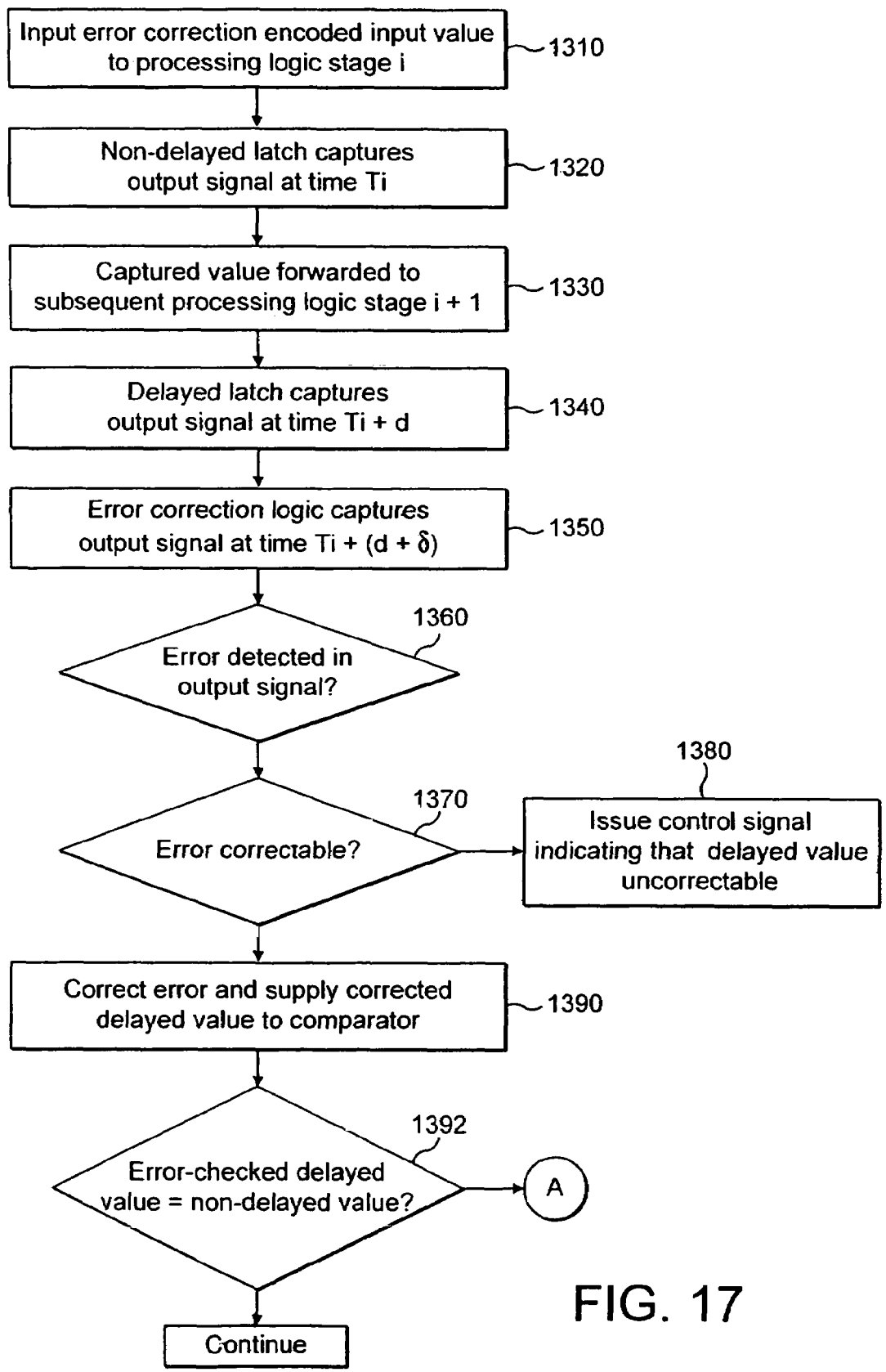
FIG. 17 is a flow chart schematically illustrating the operation of the circuit of FIG. 14.

FIG. 17 is a flow chart that schematically illustrates the operation of the circuit of FIG. 14 that comprises error correction control of the delayed latch value. At stage 1310 a twelve-bit error correction encoded signal value is input to the channel/logic unit 1014. Next, at stage 1320, the non-delayed latch 1016 captures the output from the channel/logic unit 1014 at time Ti and the captured value is forwarded to subsequent processing logic stage I+1 at stage 1330. At stage 1340 the delayed latch 1018 captures the output signal at time Ti+d. At stage 1350, the error detection logic captures the output from the channel/logic unit 1014 at time Ti+(d+δ). Although δ in preferred arrangements δ is zero so that value output by the delayed value itself is actually error checked, the output may alternatively be captured a short after the delayed latch captures the output signal at Ti+d. The capture of the value for supply to the error detection circuit is appropriately timed to ensure that any random error in the delayed value is detected. At stage 1360, the error detection module 1026 determines whether the delayed output signal has an error using the redundancy bits. If an error is detected it is then determined whether the error is correctable at stage 1370, which will depend on how many bits are affected. For example, a Hamming code can only correct a single bit error. If it is determined at stage 1370 that the error is correctable then the process proceeds to stage 1390, whereupon the error is corrected and the corrected delayed value is selected at the multiplexer 1022 and supplied to the comparator 1024. However, if it is determined at stage 1370 that detected errors are not correctable then a control signal is generated indicating that an uncorrectable error has occurred. In this case forward progress of the computation cannot be reliably performed. At stage 1392 the comparator 1024 determines whether the error-checked delayed value is equal to the non-delayed value and if so forward progress of the computation continues. Otherwise the process to the sequence of steps described in relation to FIG. 4B, involving suppression of the non-delayed value and its replacement by the delayed value in subsequent processing stages is carried out.

Figure 18:
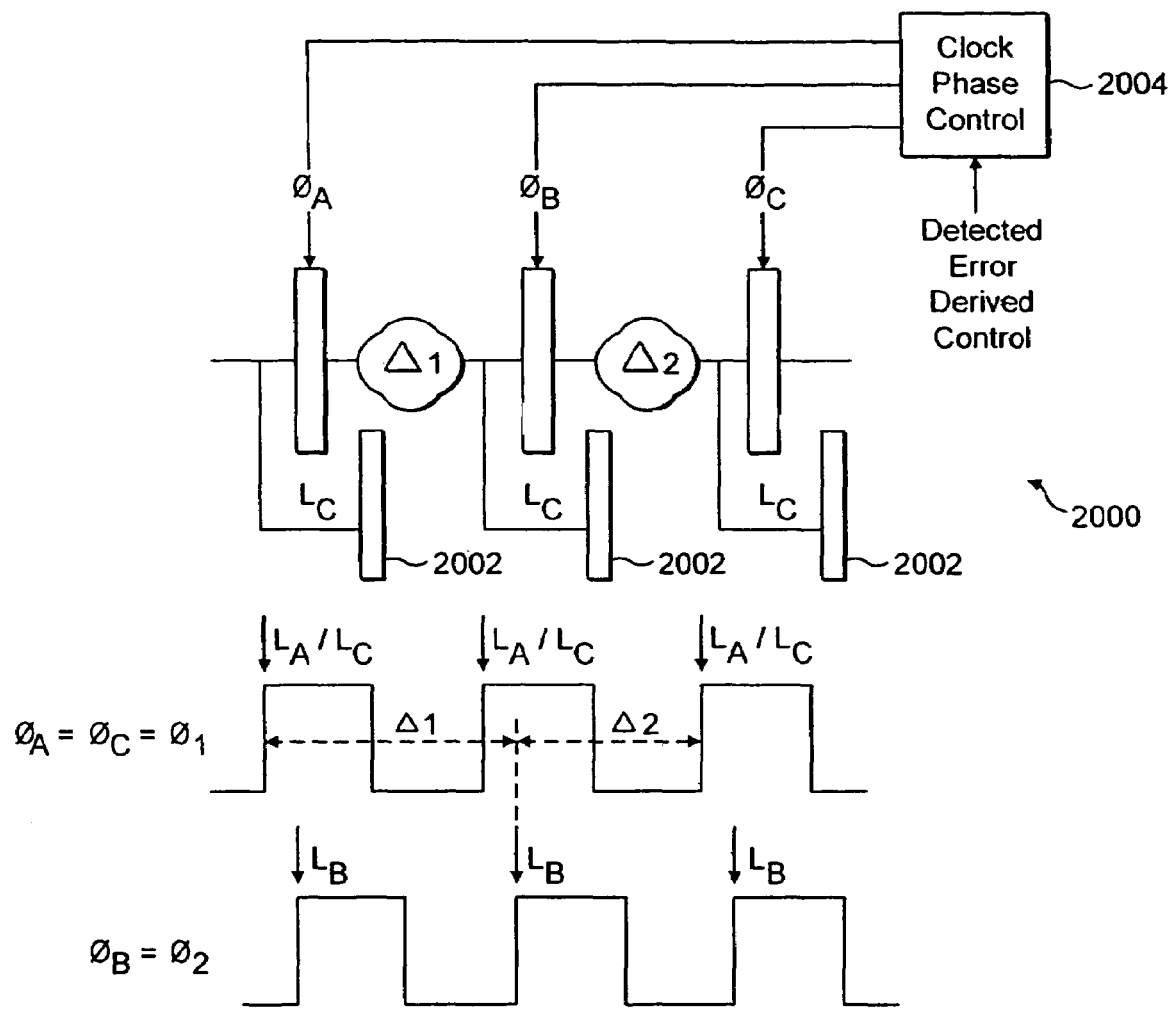
FIG. 18 schematically illustrates how delayed and non-delayed latches can be used to control the relative phases of clock signals within a processing pipeline.

FIG. 18 illustrates the use of the present technique to dynamically adjust the relative timing between processing stages. It is known that in a pipelined processing environment, the processing stages may take different times to complete their respective operations. Ideally the processing stages would all be balanced to take the same time and for their respective times to vary in the same way with changes in surrounding conditions. However, this is not practical in many cases and it may be that a collection of processing stages that are balanced at one operational voltage or temperature are not balanced at another operational voltage or temperature. Furthermore, manufacturing variation and other characteristics may result in considerable differences between processing stage timings which upsets the designed balance therebetween. In these cases, the clock frequency and other operational parameters are chosen with respect to a worst-case scenario such that the processing stages will be sufficiently closely balanced so as to be operational under all conditions.

The present technique allows a more selective and indeed dynamic approach to be taken. A pipelined processing circuit 2000 includes delayed latches 2002 which can be used to detect the occurrence of errors in the signal values being captured by the non-delayed latches. The occurrence of these errors is fed back to a clock phase control circuit 204 which serves to adjust the relative phases of the clock signals being supplied to respective latches within the main path, i.e. the non-delayed latches. In this way, an adjustment is made whereby time is effectively borrowed from one processing stage and allocated to another processing stage. This may be achieved by tapping the clock signals to be used by the respective non-delayed latches from selectable positions within a delay line along which the basic clock signal is propagated.

The illustrated example, the processing logic between latch $L_A$ and latch $L_B$ is slower in operation than the processing logic in the subsequent stage. Accordingly, the clock signal being supplied to the non-delayed latch $L_B$ can be phase shifted so as to delay the rising edge of that clock signal (assuming rising edge latch capture) and thereby to extend the time available for the slow processing logic. This reduces the time available for the processing logic within the subsequent processing stage assuming that this is operating on the same basic clock signal as the other stage elements excluding the latch $L_B$.

This timing balancing between processing stages can be performed dynamically during the ongoing operation of the circuit using feedback from the errors in operation detected using the delay latches. Alternatively, the balancing can be performed as a one-off operation during a manufacturing test stage or during a "golden boot" of the integrated circuit. The delayed latches shown in FIG. 18 are used for the purpose of timing balancing between processing stages and can thereafter be used for the control of operating parameters and error correction as discussed above, e.g. in relation to FIG. 1. In this way, the provision of the delayed latches is further used to also control relative clock timings.

Figure 19:
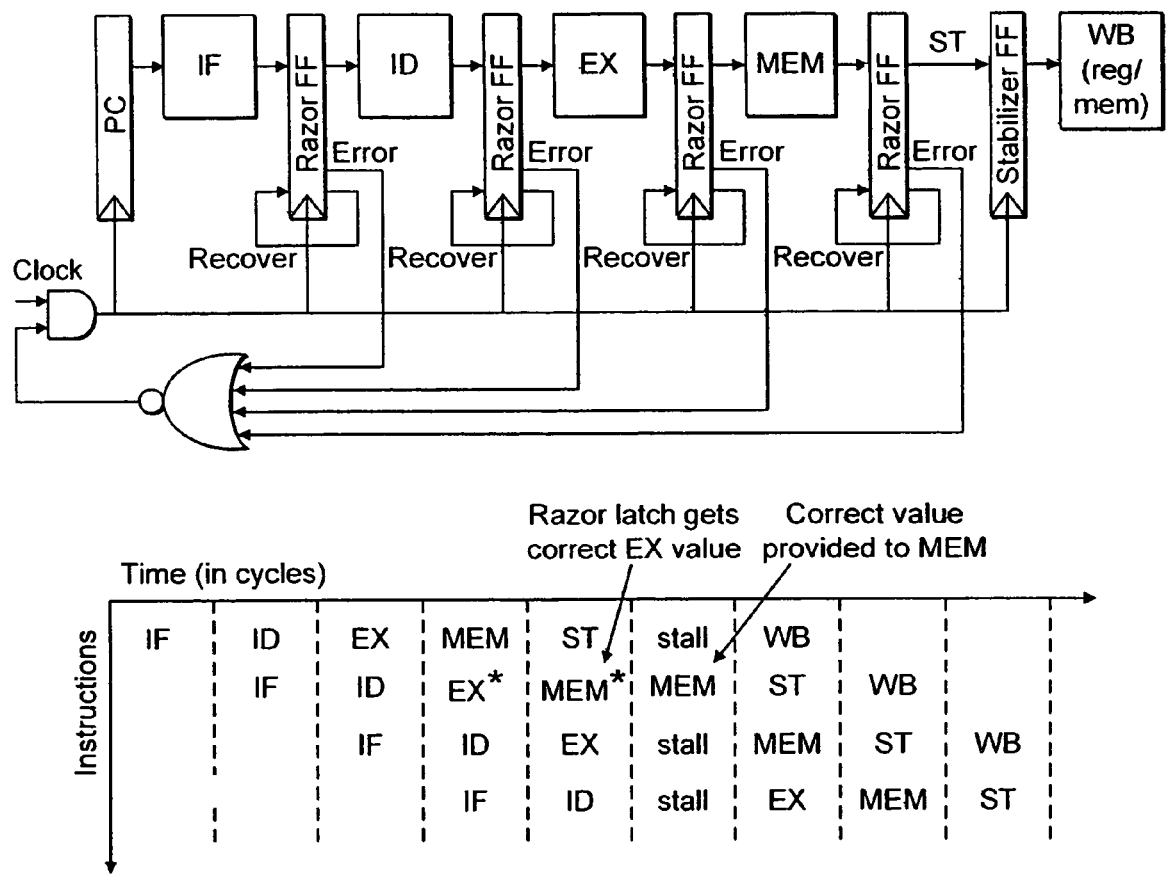

FIG. 19 illustrates a simple approach to pipeline error recovery based on global clock gating. In the event that any stage detects an error, the entire pipeline is stalled for one cycle by gating the next global clock edge. The additional clock period allows every stage to recompute its result using the delayed latch as input. Consequently, any previously forwarded errant values will be replaced with the correct value from the delayed latch. Since all stages re-evaluate their result with the delayed latch input, any number of errors can be tolerated in a single cycle and forward progress is guaranteed. If all stages produce an error each cycle, the pipeline will continue to run, but at ½ the normal speed.

It is important that errant pipeline results not be written to architectured state before it has been validated by the comparator. Since validation of delayed values takes two additional cycles (i.e., one for error detection and one for panic detection), there must be two non-speculative stages between the last delayed latch and the writeback (WB) stage. In our design, memory accesses to the data cache are non-speculative, hence, only one additional stage labelled ST for stabilise is required before writeback (WB). The ST stage introduces an additional level of register bypass. Since store instructions must execute non-speculatively, they are performed in the WB stage of the pipeline.

FIG. 19 gives a pipeline timing diagram of a pipeline recovery for an instruction that fails in the EX stage of the pipeline. The first failed stage computation occurs in the $4^{th}$ cycle, but only after the MEM stage has computed an incorrect result using the errant value forward from the EX stage. After the error is detected, a global clock stall occurs in the $6^{th}$ cycle, permitting the correct EX result in the Razor shadow latch to be evaluated by the MEM stage. IN the $7^{th}$ cycle, normal pipeline operation resumes.

In aggressively clocked designs, it may not be possible to implement global clock gating without significantly impacting processor cycle time. Consequently, a fully pipelined error recover mechanism based on counterflow, pipelining techniques has been implemented. The approach, illustrated in FIG. 20, places negligible timing constraints on the baseline pipeline design at the expense of extending pipeline recovery over a few cycles. When a non-delayed value error is detected, two specific actions must be taken. First, the errant stage computation following the failing non-delayed latch must be nullified. This action is accomplished using the bubble signal, which indicates to the next and subsequent stages that the pipeline slot is empty. Second, the flush train is triggered by asserting the stage ID of failing stage. In the following cycle, the correct value from the delayed latch data is injected back into the pipeline, allowing the errant instruction to continue with its correct inputs. Additionally, there is a counterflow pipeline whereby the flush train begins propagating the ID of the failing stage in the opposite direction of instructions. At each stage visited by the active flush train, the corresponding pipeline stage and the one immediately preceding are replaced with a bubble. (Two stages must be nullified to account for the twice relative speed of the main pipeline.) When the flush ID reaches the start of the pipeline, the flush control logic restarts the pipeline at the instruction following the errant instruction. In the event that multiple stages experience errors in the same cycle, all will initiate recovery but only the non-delayed error closest to writeback (WB) will complete. Earlier recoveries will be flushed by later ones. Note that the counterflow pipeline may not be the same length as the forward pipeline so that, for example, the flush train of the counterflow pipeline could be two pipeline stages deep whereas the forward pipeline may be twelve stages deep.

FIG. 20 shows a pipeline timing diagram of a pipelined recovery for an instruction that fails in the EX stage. As in the precious example, the first failed stage computation occurs in the $4^{th}$ cycle, when the second instruction computes an incorrect result in the EX stage of the pipeline. This error is detected in the $5^{th}$ cycle, causing a bubble to be propagated out of the MEM stage and initiation of the flush train. The instruction in the EX, ID and IF stages are flushed in the $6^{th}$, $7^{th}$ and $8^{th}$ cycles, respectively. Finally, the pipeline is restarted after the errant instruction in cycle 9, after which normal pipeline operation resumes.

Recall from the description of FIG. 2 above, that in the event that circuits 102 detect meta-stability in the eror signal then a panic signal is asserted. In this case, the current instruction (rather than the next instruction) should be re-executed. When such a panic signal is asserted, all pipeline state is flushed and the pipeline is restarted immediately after the least instruction writeback. Panic situations complicate the guarantee of forward progress, as the delay in detecting the situation may result in the correct result being overwritten in the delayed latch. Consequently, after experiencing a panic, the supply voltage is reset to a known-safe operating level, and the pipeline is restarted. One re-tuned, the errant instruction should complete without errors as long as returning is prohibited until after this instruction completes.

A key requirement of the pipeline recover control is that it not fail under even the worst operating conditions (e.g. low voltage, high temperature and high process variation). This requirement is met through a conservative design approach that validates the timing of the error recovery circuits at the worst-case subcritical voltage.

Figure 21:
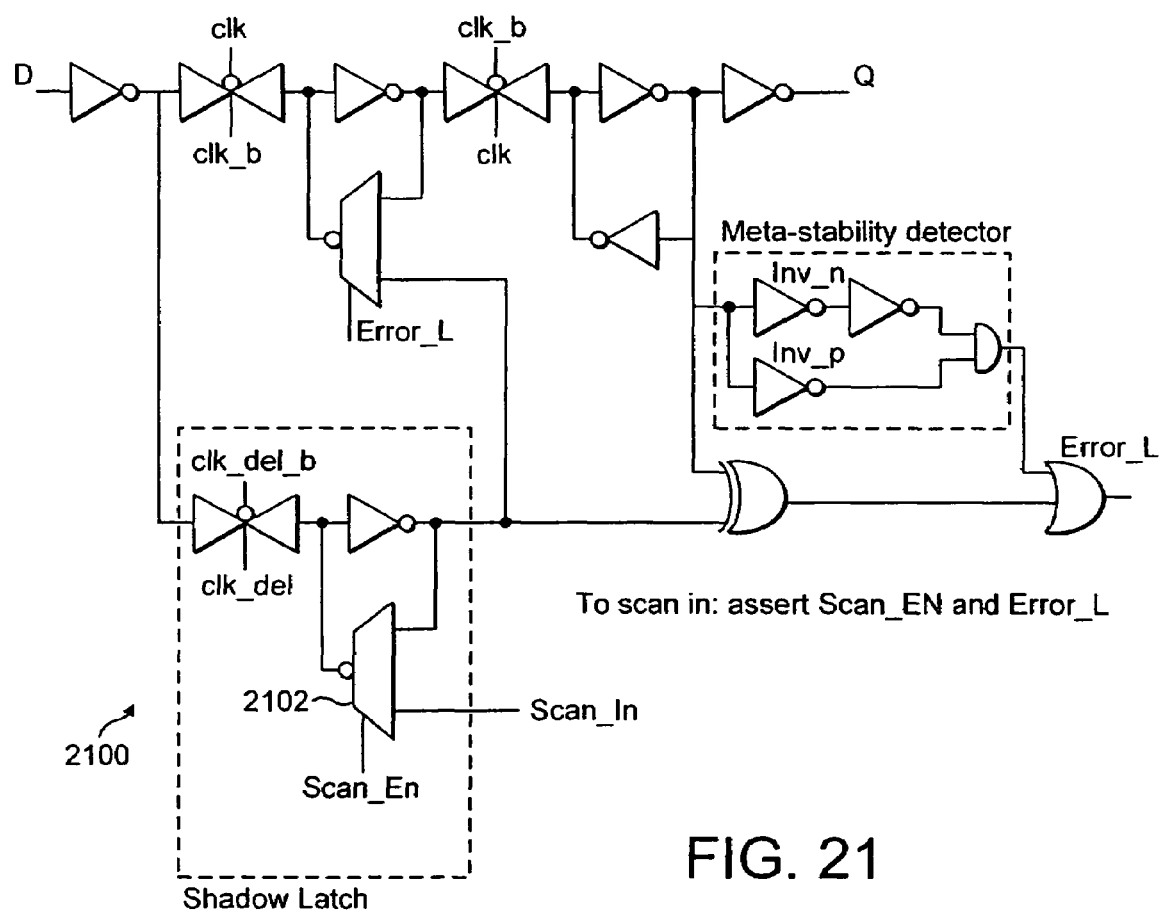
FIG. 21 illustrates a non-delayed and delayed latch for use between processing stages with the delayed latch being reused as a serial scan chain latch.

FIG. 21 schematically illustrates the re-use of a delayed latch 2100 as a serial scan chain latch. This is achieved by the provision of a multiplexer 2102 controlled by the scan enable signals which allow a serial scan data value to be written into the delay latch or serially read from the delayed latch as required. Furthermore, the normal mechanism which allows the delayed latch value to replace the non-delayed latch value is exploited to allow a serial scan chain value to be inserted into the operational path.

Figure 22:
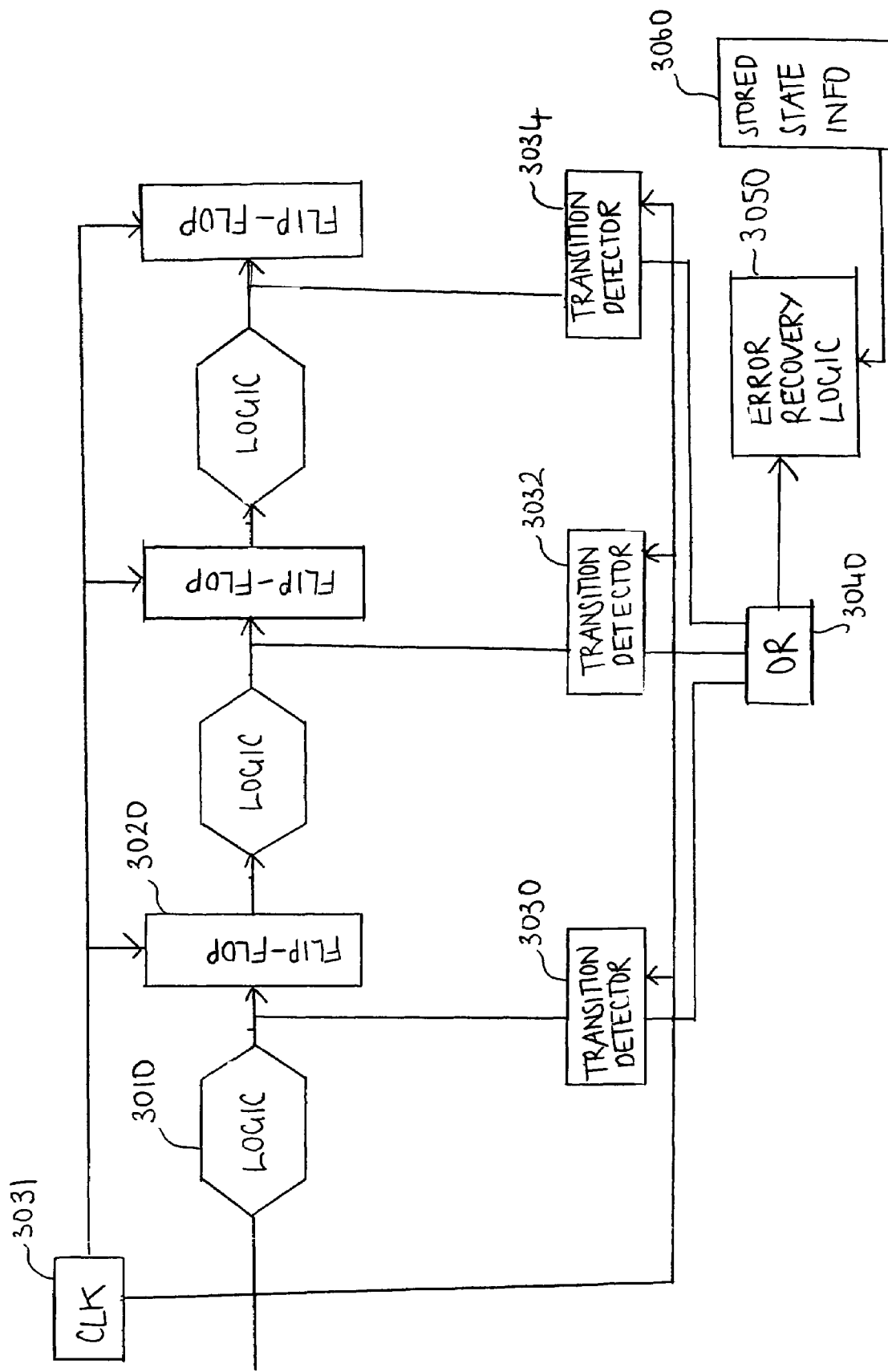
FIG. 22 schematically illustrates one example of a plurality of processing stages of an integrated circuit to which the present technique is applied.

FIG. 22 schematically illustrates part of an integrated circuit, which may be part of a synchronous pipeline within a processor core, such as an ARM processor core designed by ARM Limited of Cambridge, England. A synchronous pipeline is formed of a plurality of processing stages. The first stage comprises logic module 3010 followed by a latch 3020 in the form of a flip-flop. The output of the logic module 2010 is supplied to a transition detector 3030, which is operable to detect a transition in the logic signal value, which occurs in a predetermined time window and is indicative of an error in operation of the integrated circuit. Such errors in operation are likely to arise if the operating parameters for the integrated circuit are such that the logic module 3010 has not completed its processing operation by the time the flip-flop 3020 captures its value.

The operating parameters of the integrated circuit include the clock-signal frequency supplied by a clock 3031, an operating voltage supplied to the integrated circuit, the body bias voltage, the temperature etc. In particular, if the clock frequency is set to be so rapid that the slowest of the processing data stages is unable to keep pace, or if the operating voltage of the integrated circuit is reduced so as to reduce power consumption to the point at which the slowest of the processing stages is no longer able to keep pace, then systematic processing errors will occur. Subsequent processing stages of the integrated circuit are similarly formed of a logic module that leads into a transition detector and a flip-flop that captures the output value of the associated logic module.

In FIG. 22 three stages of processing are illustrated and there are three corresponding transition detectors 3030, 3032 and 3034. The outputs of these transition detectors are each supplied to an OR gate 3040. A high output from the OR gate 3040 indicates that a processing error has occurred in at least one of the associated logic modules. This indication of an error is supplied as an output of the OR gate 3040 and as an input to an error recovery logic module 3050, which is responsive to each of the transition detectors and is operable to enable the integrated circuit to recover from an error in operation. Recovery from an error in operation is achieved by the error recovery logic 3050 by using stored state information 3060. The stored state information 3060 allows the integrated circuit to recover from the error in operation by enabling a return to a previous state of processing from which to re-commence the calculation. The state information may include both architectural state variables and micro-architectural state variables.

Architectural state variables correspond to those variables that would be specified in a programmer's model of the integrated circuit, for example register values, instruction flags, program counter values etc. An example of micro-architectural state variables is cache content. For example, for an ADD instruction with a flag set, execution of the instruction ADDS R0 R0 R1 would involve storage of state variable R0, the flags associated with the flag set operation and the program counter value associated with this instruction. Other examples of state variables are the particular operational mode of the processor, such as privileged mode or user mode.

The error recovery logic 3050 enables forward progress of the computation in the presence of errors in operation of the integrated circuit. This is achieved by detection of timing errors by the transition detectors 3030, 3032, 3034 and the use of the error recovery logic 3050 to recover from the detected error using the stored state information 3060. The stored state information 3060 used for error recovery will be the values that have been confirmed to be unaffected by errors in operation and most recently stored to registers. Such stored values correspond to the architectural state of the integrated circuit prior to the detection of an error in operation.

Figure 23:
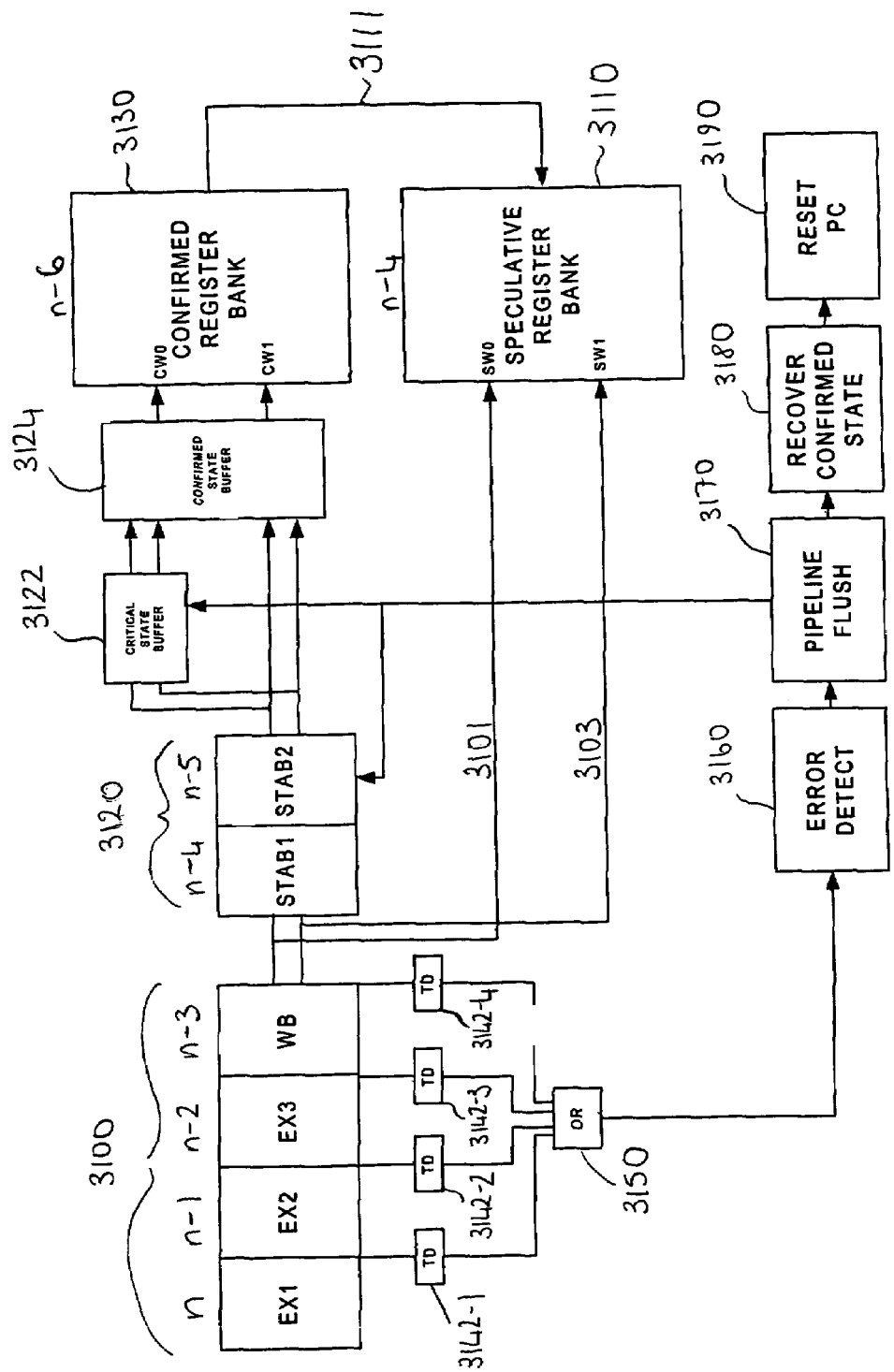
FIG. 23 schematically illustrates a pipeline in which error recovery is performed using a confirmed register bank together with a speculative register bank.

FIG. 23 schematically illustrates an arrangement according to one example of the present technique that uses a confirmed register bank in addition to the speculative register bank to recover from an error in operation. The arrangement comprises: a main processing pipeline 3100; a speculative register bank 3110; a plurality of stability pipeline stages 3120; a critical state buffer 3122; a confirmed state buffer 3124; a confirmed register bank 3130; an array of transition detectors 3142-1 to 3142-4; an OR logic gate 3150; error detection logic 3160; pipeline flush logic 3170; confirmed state recovery logic 3180; and program counter reset logic 3190. The main processing pipeline 3100 comprises four distinct pipeline stages, a first execution stage n, a second execution stage n-1, a third execution stage n-2 and a writeback stage n-3. Outputs from a processing pipeline stage are passed to the subsequent pipeline stage via a latch (such as a flip-flop 3020 of FIG. 22). The output of the writeback pipeline stage n-3 is supplied to the speculative register bank 3110 via the signal paths 3101 and 3103, which lead respectively to the two write ports SW0 and SW1 of the speculative register bank 3110. In the particular arrangement illustrated in FIG. 23 the writeback stage of the main pipeline corresponds to processing stage n-3 and thus the last state that has been stored in the speculative register bank 3110 in this arrangement corresponds to the processing stage n-4.

Output from the first execution stage n is output to the transition detector 3142-1; output from the second execution stage n-1 is output to the transition detector 3142-2; output from the third execution stage of the main pipeline n-2 is output to the transition detector 3142-3; and finally output from the writeback stage WB of the main pipeline 3100 is output to the transition detector 3142-4. Each of these transition detectors 3142-1 to 3142-4 is capable of indicating an error in operation of the processing circuitry. The outputs of all four transition detectors are supplied with inputs to the OR logic gate 3150, whose output is supplied to the error detection logic 3160. Thus if any transition is detected in any one of the four main pipeline states n, n-1, n-2 or n-3 then the OR logic gate will output a value indicative of an error in operation. The error detection logic 3160 is responsive to the output of the OR logic gate 3150 to initiate error recovery processes performed by the pipeline flush logic 3170, confirmed state recovery 3180 logic and program counter reset 3190 logic so that the detected error in operation does not affect any of the values stored within the confirmed register bank 3130. Thus in response to a detected error in operation the pipeline flush logic 3170 initiates a pipeline flush to clear the pipeline of any potentially erroneous values. The pipeline flush logic 3170 is connected both to the critical state buffer 3122 and to the stability pipeline stages 3120. In the event of a detected error in operation all of the values in the main pipeline are flushed in addition to the values in the stability stages of the pipeline 3120 and all of the values currently stored in the critical state buffer 3022 which have not yet been stored in the confirmed register bank 3130. Once the pipeline has been flushed the confirmed state recovery logic 3180 initiates a series of processing operations whereby the data processing apparatus is returned to a previous state in which the instruction whose values have most recently been stored in the confirmed register bank 3130 has just been executed. Re-execution starting from this instruction is commenced after the program counter reset logic 3190 has reset the program counter from the current instruction to the instruction following that for which values have most recently been stored to the confirmed register bank 3130.

Normal processing operations involve execution of a plurality of instructions each of which may involve the update of a number of different types of architectural state variables. For example execution of a single given instruction may require that one or more general purpose registers, flags, a program-status register, or a program counter be updated. However, the physical elements that store these updated variables will not necessarily be updated in one and the same clock cycle, even though they relate to the same given instruction. For example, in the ARM$^{RTM}$ instruction set a load instruction is not capable of changing the flags and thus it is possible to store the updates to the flags in a processing cycle earlier than that in which the updates to the general purpose registers are stored. Note that the general purpose registers cannot be updated until it is known that a load instruction has not generated a memory-stage related exception, such as a permission fault. It will be appreciated that an error in operation could happen in any processing cycle. Thus, in the arrangement of FIG. 23 it is necessary to ensure that updates to the confirmed register bank 3130 are "synchronised" to ensure that recovery is possible using instruction re-execution. This is achievable only if a certain critical sub-set of architectural state-variables have been stored in the confirmed register bank 3130. To ensure that all of the critical sub-set of architectural state variables are available to enable re-execution, the critical state buffer 3122 of FIG. 23 is provided to hold updated values associated with a given instruction until it is known that all of the values for critical state updates associated with that particular instruction are available and that all of the non-critical state updates have either already been stored to the confirmed register bank 3130 or are present in the confirmed state buffer 3124. Only once all of the values associated with the given instruction are available are the critical variables associated with that instruction be stored in the confirmed register bank 3130. The confirmed register bank 3130 has two write ports indicated as CW0 and CW1. Similarly, the speculative register bank has two write ports SW0 and SW1.

Note that the actual physical update of values associated with a given instruction to the confirmed register bank may not happen immediately. This will be the case for example, if more critical state updates are required than can be performed in a single processing cycle due to the limited number of write ports on the register bank (in this case two write ports). The output of the critical state buffer is supplied to the confirmed state buffer 3124 before being supplied to the confirmed register bank 3130. The confirmed state buffer 3124 is simply a write-buffer for the confirmed register bank 3130. This is provided to avoid stalling the entire pipeline in the event that there are more than two confirmed values to be written to the confirmed register bank 3130 in a given processing cycle (e.g. due to the re-ordering of the critical state updates).

The output of the stability pipeline stages 3120 is supplied both to the critical state buffer 3122 and to the confirmed state buffer 3124. The stability pipeline stages 3120 allow sufficient time for errors in operation in the main pipeline to be detected by the error detection logic 3160 prior to those values being stored in the confirmed register bank 3130.

Consider the case where the transition detector 3142-3 indicates that an error has occurred in the third execution state of the main pipeline corresponding to instruction n-2. In this case, the program counter resetting logic 3190 will reset the program counter from the instruction n to the instruction n-5, since the last confirmed state of the integrated circuit corresponds to the instruction n-6. The confirmed state corresponding to the instruction n-6 is recovered by copying the data pertaining to the critical sub-set of state variables associated with instruction n-6 from the confirmed register bank 3130 into the speculative register bank 3110 via data path 3111. Execution of the processing operations then proceeds from stage n-5 onwards so that the error in operation of the integrated circuit does not affect the outcome of the calculation. The last processing state to be stored in the confirmed register bank 3130 is the state information for processing stage n-6.

The state variables stored in the confirmed register bank 3130 have a greater mean time between failures (and are thus much less likely to be erroneous) than the state variables stored in the speculative register bank 3110. Accordingly state variables from the confirmed register bank 3130 are used to recover from the detected error in operation in the main pipeline 3100 by restoring the last confirmed state n-6 when an error in operation is detected. Thus the system is able to recover from operation errors by using the last confirmed state of the integrated circuit.

Note that the arrangement of FIG. 23 is a simplified arrangement provided for the purposes of illustration. In other arrangements according to the present technique there will not be a one-to-one correspondence between instructions and pipeline stages since a single instruction can potentially span several pipeline stages. Accordingly, in such alternative arrangements the program counter corresponding to the instruction whose critical variables were last stored to the confirmed register bank 3130 is not simply derived from the current program counter and the length of the pipeline. Rather, the program counter corresponding to the last successfully executed instruction is obtained from a separate pipeline of program counter values that shadows the main execution pipeline.

Figure 24A:
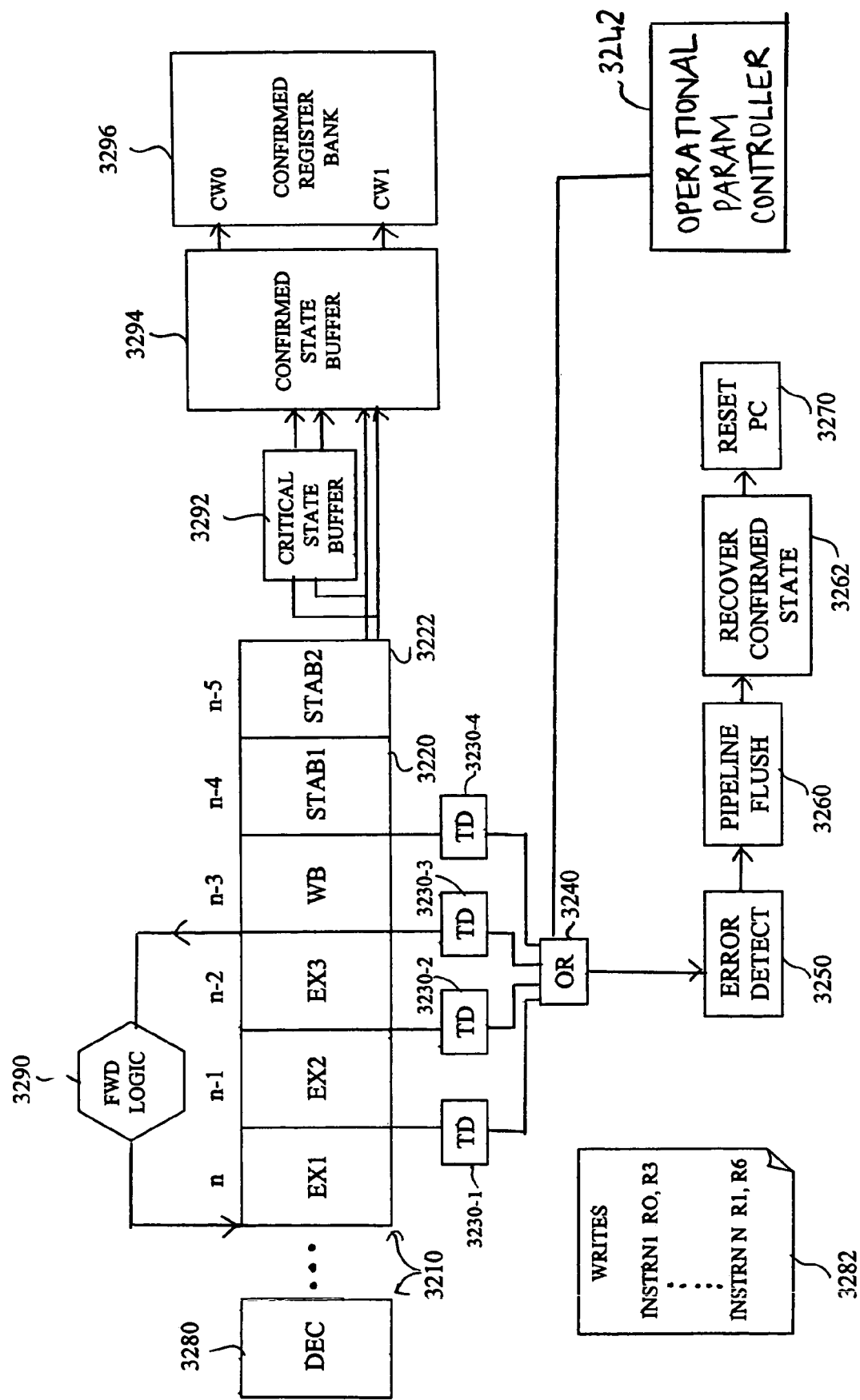
FIG. 24A schematically illustrates a pipeline arrangement in which error recovery is performed using state variables stored in a single register bank.

FIG. 24A schematically illustrates an arrangement according to the present technique comprising a number of stability pipeline stages appended to the end of the main pipeline. The arrangement comprises a plurality of pipeline stages 3210 including two stability stages 3220 and 3222 at the end of the pipeline; an array of transition detectors 3230-1 to 3230-4; an OR gate 3240; an operational parameter controller 3242; error detection logic 3250; pipeline flush logic 3260; confirmed state recovery logic 3262; program counter resetting logic 3270; a decode pipeline stage 3280; a score card file 3282, forwarding logic 3290; a critical state buffer 3292; a confirmed state buffer 3294 and a confirmed register bank 3296.

As in the example embodiment of FIG. 23, the pipeline 3210 comprises three execute stages corresponding to instructions n, (n-1), (n-2) and (n-3). Appended to the end of this pipeline are the two stability stages 3220 and 3222 corresponding respectively to two instructions (n-4) and (n-5). Appending the additional stability stages directly to the end of the main pipeline in this way causes the output to the register bank to be slightly delayed but these extra stability stages give the integrated circuit the opportunity to detect the occurrence of an error in operation before output of data to the register bank 3296. This means that the error detection process will have completed by the time the output of the pipeline is supplied to the register bank 3296. Again the outputs of each of the processing stages of the main pipeline are supplied to transition detectors 3200-1 to 3200-4, which in turn supply their outputs to the OR gate 3240. In the event of detection of an error, error recovery is initiated via the error detection logic 3250 using the pipeline flush logic 3260, the confirmed state recovery logic 3262 and the program counter reset logic 3270, similarly as described above with reference to FIG. 23. The occurrence of an error in operation is also signalled to the operational parameter controller 3242, which is operable to adjust at least one of the clock frequency, the operating voltage, the body biased voltage or the temperature in dependence upon one or more characteristics of detected errors in operation so as to maintain a finite non-zero error note in a manner that increases overall efficiency. As mentioned above with reference to FIG. 24A, it will be appreciated that in alternative embodiments, there is not a one-to-one correspondence between pipeline stages and instructions.

In this example the two stability stages correspond to instruction numbers (n-4) and (n-5) respectively, which means that the last committed state variables in the register bank correspond to instruction number (n-6). Thus, for example, in the event of an error at pipeline stage (n-1) the transition detector 3230-2 is triggered, which in turn triggers a high output from the OR gate 3240. A recovery sequence is initiated and the pipeline is flushed to eliminate any pipeline values affected by the error. The program counter is reset by the logic 3270 from instruction n to the instruction (n-5) to enable forward progress of the calculation. Since the additional stability stages 3220 and 3222 incur some delay in the instruction execution in the pipeline it is appropriate to provide forwarding logic 3290 that connects output of one pipeline stage to the input of earlier pipeline stages corresponding to later executed instructions. In this case the output of pipeline stage (n-2) is fed as input to a pipeline stage associated with execution of instruction n. Forwarding logic (not shown) is also provided from pipeline stages (n-5), (n-4), (n-3) and (n-1) and from the critical state buffer 3292 and the confirmed state buffer 3294. This enables non-committed values from later pipeline stages that have not yet been saved to the register bank 3292 to be supplied as input to subsequent processing instructions where appropriate.

The integrated circuit uses the score card file 3282 to keep track of which instruction writes to which register number(s). The score card file is written to by an earlier stage of the pipeline, in particular the decode stage 3280 of the pipeline 3210. The score card 3282 need only keep track of which instruction writes to which register and not of which instruction reads from which register since only the instruction writes are likely to affect input values to the various pipeline stages. For example, if the instruction at stage (n-2) writes to the register R3 and the subsequent instruction executed at pipeline stage n reads from register R3 as an input before the output of instruction (n-2) has been committed to the register bank, it is necessary to provide the output corresponding to the value to be written to register R3 as an input to the pipeline stage corresponding to instruction n.

Note that in the arrangements of both FIG. 23 and FIG. 24A the stages of error detection, pipeline flushing, program counter resetting and recovery of the last confirmed state can be performed in a number of different orders and the present technique is not restricted to the particular ordering of these logic modules as illustrated in these Figures.

In the arrangement of FIG. 24A if an error should occur at processing stage (n-1), the state variables of the integrated circuit will be restored to the value corresponding to the last instruction that was committed to the register bank 3296. In storing the state variables used for recovery from an error, account is taken of instruction dependencies to help determine which state updates are critical. This helps to determine the ordering of writes required to leave the register bank in a consistent state, such that if an error occurs, then recovery is possible. Thus the state variables that must be restored by recovering values from the register bank will vary according to the particular error. The manner and ordering in which the state variables are stored to the register bank aids identification of a particular subset of architectural and/or micro-architectural state variables that are used by the error recovery circuits in order to recover from the error in operation.

Figure 24B:
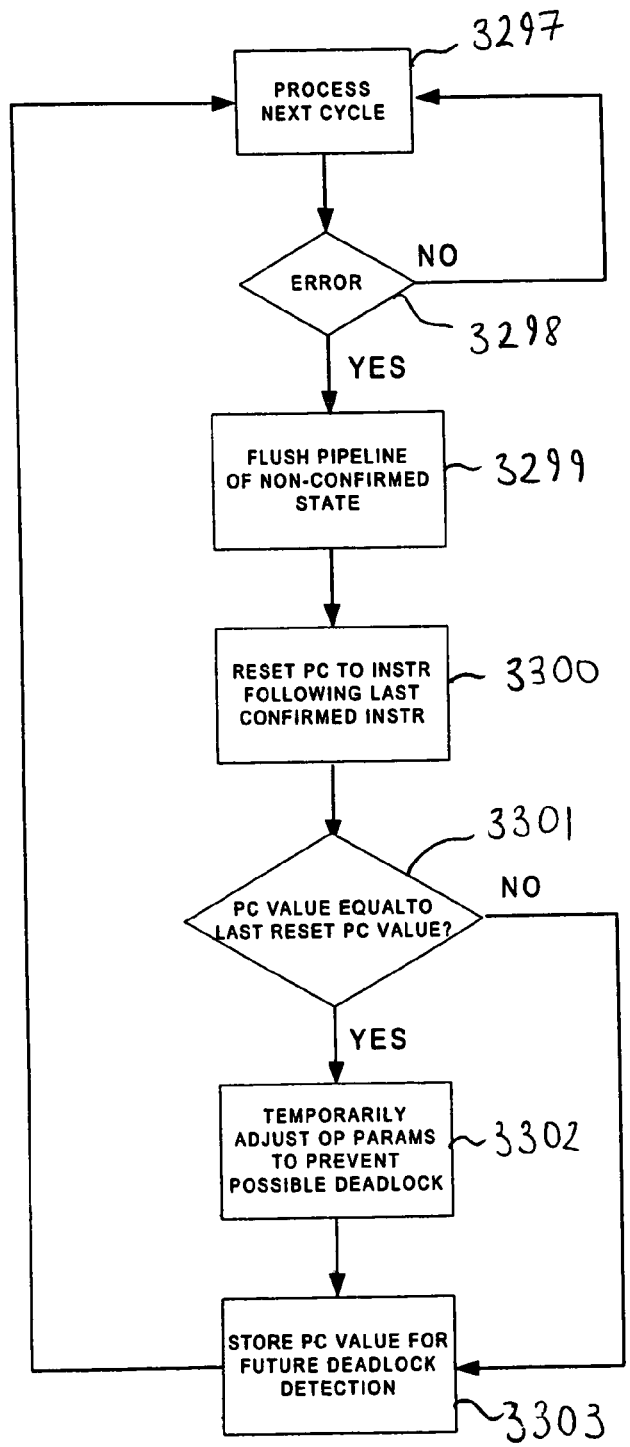
FIG. 24B is a flow chart schematically illustrating how the circuit of FIG. 3A recovers from a detected error.

FIG. 24B schematically illustrates a sequence of operations involved in error detection and recovery as performed by the circuits of FIG. 23 and FIG. 24A. At stage 3297 the processing circuitry begins processing associated with the next processing cycle and subsequently at stage 3298 it is determined whether or not an error in operation has occurred. If at stage 3298 no error in operation has been detected by one of the transition detectors then the process continues by processing the subsequent cycle at stage 3297. However, if an error in operation has been detected, then the process proceeds to stage 3299 whereupon the entire pipeline is flushed of non-confirmed state variables. In alternative arrangements only a subset of values currently stored in the pipeline need be flushed. The process then continues to stage 3300 where a program counter is reset to the instruction following the last confirmed instruction. This instigates re-execution of instructions to eliminate any effects of the error in operation. At stage 3301 it is determined whether the program counter value reset at stage 3300 is equal to the last reset program counter value. This stage of the process serves to detect a deadlock in the computation whereby a given instruction repeatedly executes resulting in an error in operation.

If at stage 3301 the current program counter value is determined not to be equal to the last reset program counter value, then the process proceeds directly to stage 3303 where the program counter value is stored for future deadlock detection. However, if it is determined at stage 3301 that the program counter value is equal to the last reset program counter value this is indicative of a deadlock. Accordingly, the process proceeds to stage 3302 where one or more operating parameters of the processor are adjusted to prevent continuation of any deadlock. In this particular arrangement the adjustment of operational parameters involves reducing the clock rate temporarily. However, it will be appreciated that in alternative arrangements the voltage could be adjusted to achieve the same result. Once the clock rate has been temporarily reduced at stage 3302, the process proceeds to stage 3303 where the program counter value is stored for future deadlock detection. The process then returns to stage 3397 whereupon the next processing cycle is executed.

Although in the arrangement according to FIG. 24B, deadlock is actively detected and a temporary change to the operational parameters is made in response to a deadlock, in alternative arrangements the operational parameters are -temporarily changed in response to every error detection e.g. by slowing the clock rate. In this case there is no need to actively detect deadlock.

Figure 24C:
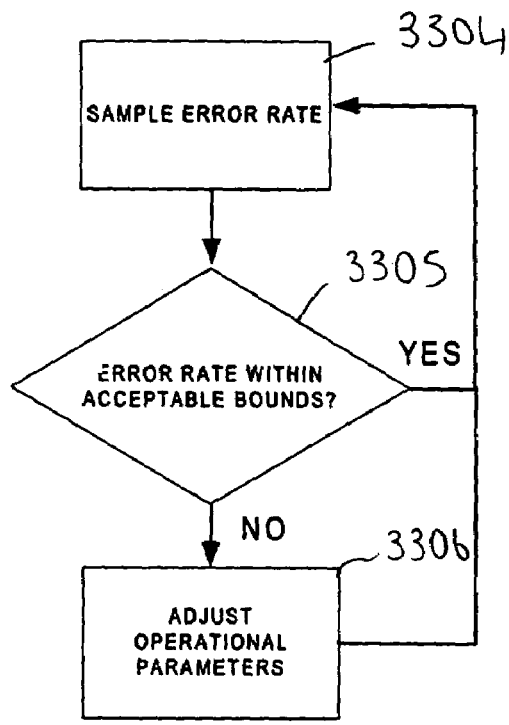
FIG. 24C is a flow chart schematically illustrating an operational parameter tuning process.

FIG. 24C schematically illustrates a flow chart showing an operational parameter tuning process according to the present technique. The operational parameter tuning process is a separate process from the error detection and recovery process of FIG. 24B. The operational parameter tuning process as illustrated in FIG. 24C is a three stage process that begins at stage 3304 with sampling the error rate associated with processing operations. It is subsequently determined at stage 3305 whether the error rate is within acceptable bounds and if this is the case then no adjustments are made to operational parameters but the error rate continues to be sampled. However, if it is determined that the error rate is not within acceptable bounds then the process proceeds to the next stage 3306 whereby the operational parameters are adjusted. If this adjustment of the operational parameters does not return the sample error rate to within the acceptable bounds, then further adjustments are made as required. The operational parameter modification process of FIG. 3C can be performed entirely in hardware or using a combination of hardware and software such that the error rate information is recorded in either hardware registers or in memory. This error rate information is subsequently read by software, which uses software programmable register to modify the operational parameters.

Figure 25:
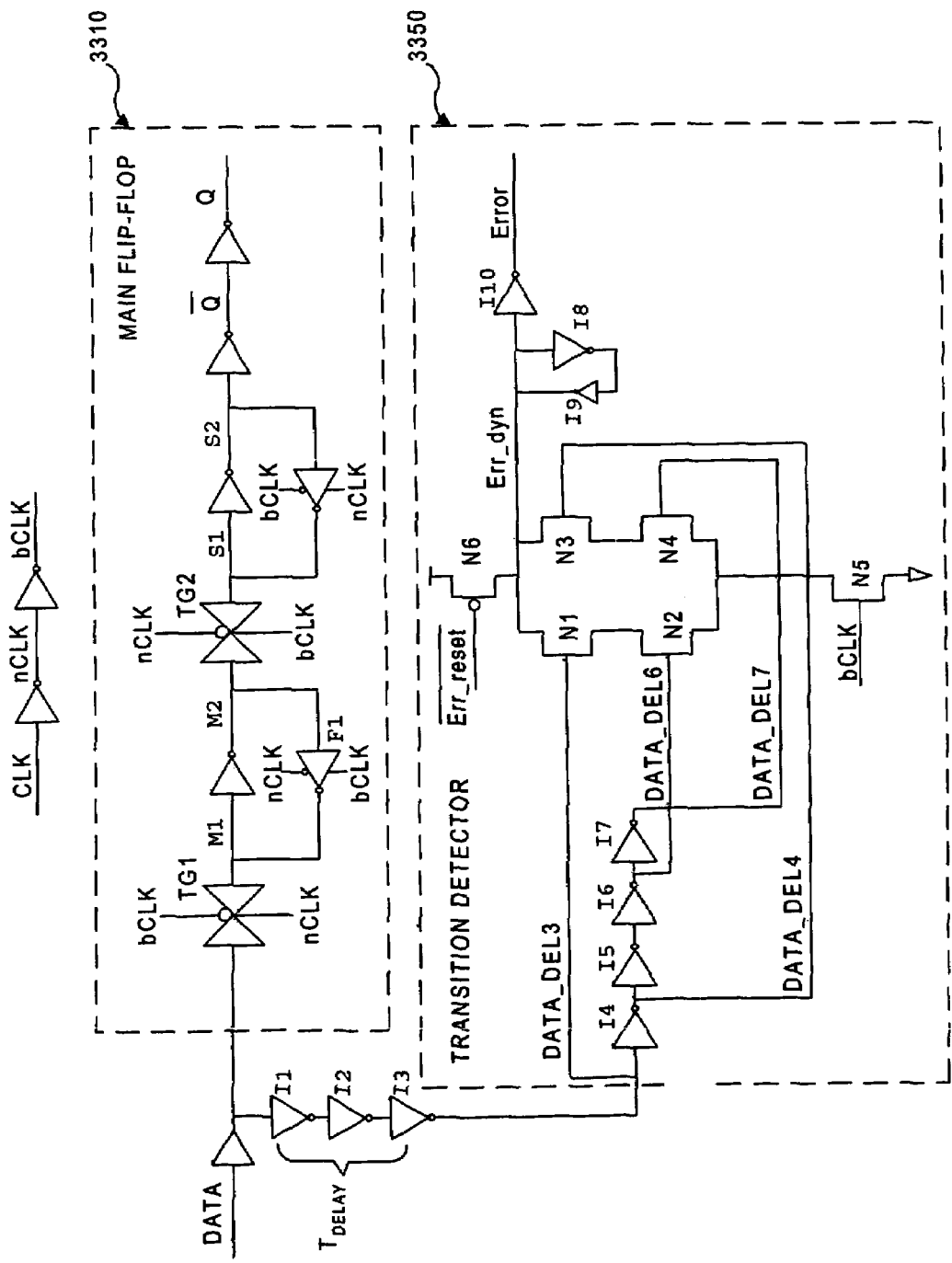
FIG. 25 schematically illustrates a transition detection D-flip-flop according to the present technique.

FIG. 25 schematically illustrates a transition detection D-type flip-flop according to the present technique. The arrangement comprises a standard master-slave positive edge triggered flip-flop 3310 and a transition detector circuit 3350. The flip-flop 3310 corresponds to the flip-flop 3020 of FIG. 22 that connects the pipeline stages. In alternative arrangements the flip-flop could be replaced by any circuit element operable to store a signal value irrespective of triggering and other requirements. The processing of the circuit arrangement of FIG. 25 is driven by a clock signal CLK. The clock signal nCLK corresponds to the clock signal after it has been passed through a single inverter element whereas the clock signal bCLK corresponds to the clock signal after it has been passed through two inverter elements. Input data is supplied to the main flip-flop and is also supplied to the transition detector 3350 via an arrangement of three inverters $I_1$, $I_2$ and $I_3$. The delay induced by the combination of three inverters is equal to the set up time of the main flip-flop. The set-up time is a characteristic of the flip-flop and represents the time required for the flip-flop circuit to stabilise at a definite logic value.

Figure 26:
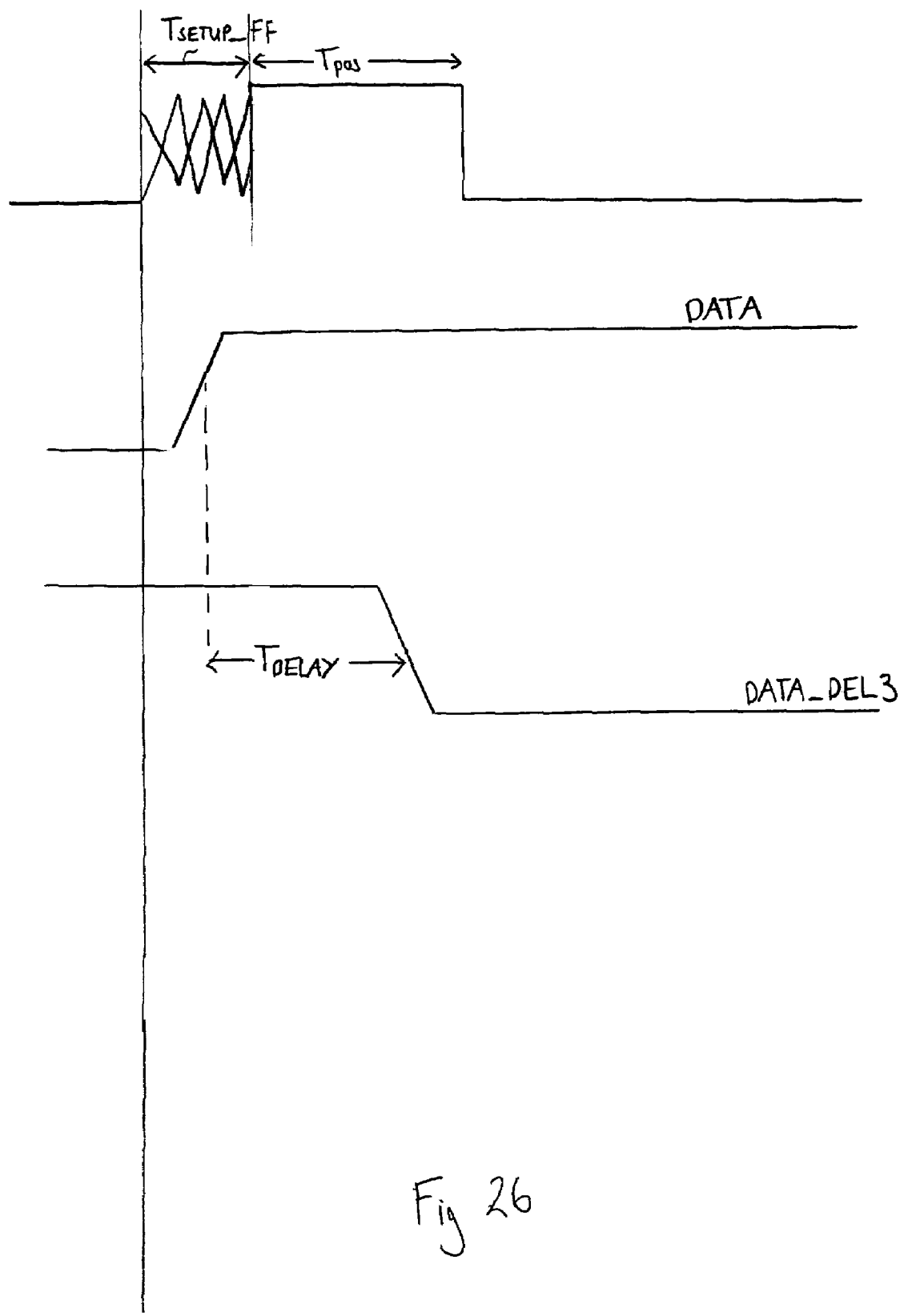
FIG. 26 schematically illustrates a functional timing diagram that illustrates how detection of a transition of data in a set up window of the main flip-flop of FIG. 4 is detected.

Within the transition detector 3350 the input signal is supplied to a series of four inverters $I_4$, $I_5$, $I_6$ and $I_7$. Outputs from various points in the inverter array are supplied to the transistor array comprising transistors N1, N2, N3, N4, N5 and N6. Transistor N1 is driven by an output derived from the signal corresponding to the input of the inverter $I_4$; the transistor N2 is driven by the output of the inverter $I_6$; the transistor N3 is driven by the output of the inverter $I_4$ and the transistor N4 is driven by the output of inverter $I_7$. The transistor N5 is on only when the clock signal is high. The transistor N6 is associated with a dynamic node ERR_DYN. The ERR_DYN node is robustly protected from discharge due to noise by back-to-back inverters $I_8$ and $I_9$ and an error output signal is output from the circuit via inverter $I_{10}$. The error signals from each individual error detection circuit are supplied to a control state machine (not shown), which is responsive to the error signals to output a global error reset signal Err_reset. This signal pre-charges the ERR_DYN node for the next error event. This conditional pre-charge scheme significantly reduces the capacitive load on a pin associated with the clock 3032 and provides a low power overhead design. It also precludes the need for an extra latching element that would otherwise be required to hold the state of the error signal during a pre-charge phase. The circuit arrangement of FIG. 25 is operable to flag an error in operation of the integrated circuit when the input data transitions either in the set up time window of the main flip-flop 3310 or during the clock phase following the sampling edge as shown in FIG. 26. A data transition in either the setup window or the following clock phase is indicative of a late transitioning input.

An alternative to the transition detector of FIG. 25 would be to use a delayed latch, to capture the output of the processing logic at a later time than performed by the flip-flop 3020. A comparison between the delayed value and the non-delayed value stored by the flip-flop 3020 can be used to determine occurrence of an error. This error detection system was described in US Application Publication No. US2004-0199821. This system involves detecting a transition by calculating a different between a signal value at a first sampling time and at a second, subsequent sampling time. However, the transition detector 3350 of FIG. 25 is arranged to detect any change of state in the signal within a predetermined time window.

FIG. 26 schematically illustrates a functional timing diagram for a data transition occurring within the set up period of the main flip-flop 3310. The set up time of the main flip-flop $T_{SETUP\_FF}$ is indicated in the upper most portion of FIG. 26 in relation to the clock edge and it can be seen that the set up time immediately precedes the clock edge. The time for which the clock edge remains positive is indicated by the time period $T_{POS}$. It can be seen that the transition in the input data occurs in the set up period of the main flip-flop in this case. However, as a result of the delay elements $I_1$, $I_2$ and $I_3$ of FIG. 25, through which the input data must pass prior to input to the transition detector 3350, the transition in the data is shifted to a later time such that it occurs within the time $T_{POS}$ but outside the period $T_{SETUP\_FF}$. The data profile DATA_DEL3 corresponds to the input to the first of the inverters $I_4$ in the transition detector 3350. This data profile is inverted with respect to the input data transition profile since it has passed through an odd number of inverters $I_1$, $I_2$ and $I_3$.

Figure 27:
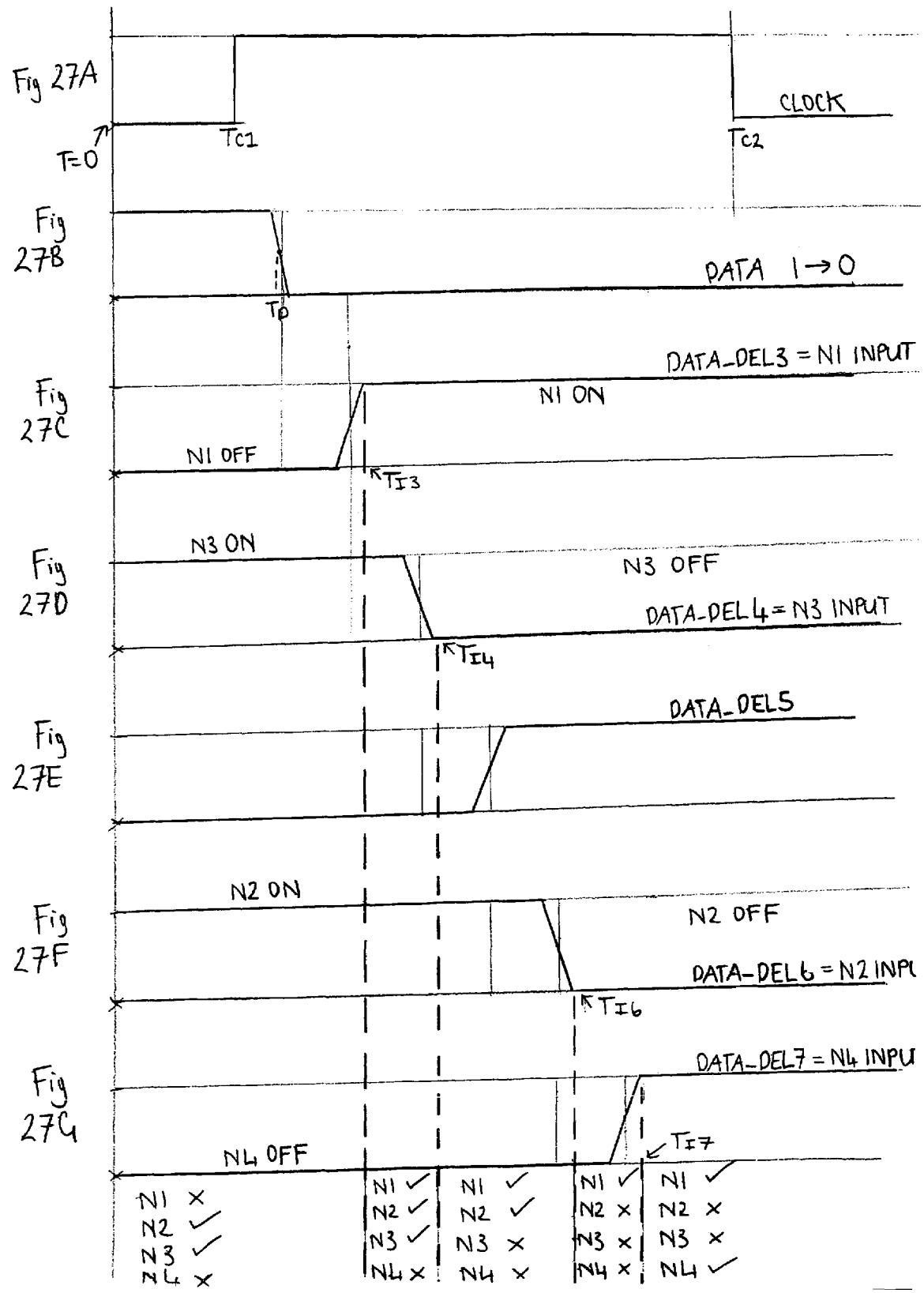
FIGS. 27A to 27G schematically illustrate functional timing diagrams for signals passing through the circuit of FIG. 4 when detection of a transition from logic level one to logic level zero is performed.

FIGS. 27A to 27G schematically illustrate functional timing diagrams representing how the circuit of FIG. 25 acts to detect a data transition from logic state one to logic state zero. The circuit of FIG. 25 detects such a transition when the transistors N1, N2 and N5 are all ON. As shown in FIG. 27A the clock signal goes from low to high at time $T_{C1}$ and returns from a high state to a low state at time $T_{C2}$. FIG. 27B shows a data transition from high to low at a time $T_D$ which is within the period of when the clock signal is high. FIG. 27C shows the profile of the signal DATA_DEL3 of FIG. 25 which is the output of the inverter $I_3$, and controls the transistor N1. This signal goes from low to high at a time $T_{13}$, which is slightly later than the data transition time $T_D$. FIG. 27D shows the data profile of data signal DATA_DEL4, which controls the transistor input N3. This data signal transitions from high to low at a time later again than $T_{13}$, that is, at the time $T_{14}$. FIG. 27E shows the data profile of data signal DATA_DEL5, which is output by delay element $I_4$ and does not supply an input to any transistors of the transistor array. FIG. 27F shows the profile of the data signal DATA_DEL6, which controls the N2 transistor input and transitions from high to low at a time $T_{16}$ which is later than the time $T_{14}$. Finally, FIG. 27G shows the profile of DATA_DEL7, which controls the input to the transistor N4 and which transitions from low to high at a time $T_{17}$, which is later again than time $T_{16}$. Transistor N1 is off before the point in time $T_{13}$ and on after that time. Transistor N3 is on prior to the time $T_{14}$ and off after that time. Transistor N2 is on prior to the time $T_{16}$ but is off after that time and the transistor N4 is off prior to the time $T_{17}$ and is on after that time. Accordingly it can be seen that there is a time window in which both transistors N1 and N2 are simultaneously switched on but there is no time window in this functional timing diagram in which both the transistors N3 and N4 are switched on.

In the time window starting at T=0 and finishing at $T_{13}$ the transistors N1 and N4 are switched off whereas the transistors N2 and N3 are switched on, since both the signal controlling N1 and the signal controlling N3 are high within that time window. In the time window between $T_{13}$ and $T_{14}$ the transistors N1, N2, and N3 are all switched on whereas the transistor N4 is switched off. In the time window between $T_{14}$ and $T_{16}$ the transistors N1 and N2 are both switched on whereas the transistors N3 and N4 are both switched off. In the time window between $T_{16}$ and $T_{17}$ the transistor N1 is the only transistor that is switched on and in the time window between $T_{17}$ and $T_2$ the transistors N1 and N4 are switched on whereas the transistors N2 and N3 are switched off. Accordingly for the duration when the clock pulse is high (when the transistor N5 is switched on) and from the time $T_{13}$ to the time $T_{16}$ the transistors N1, N2 and N5 are all switched on. This will result in the detection of a transition since a conduction path is provided from the array of transistors to the latch node Err_dyn.

Figure 28:
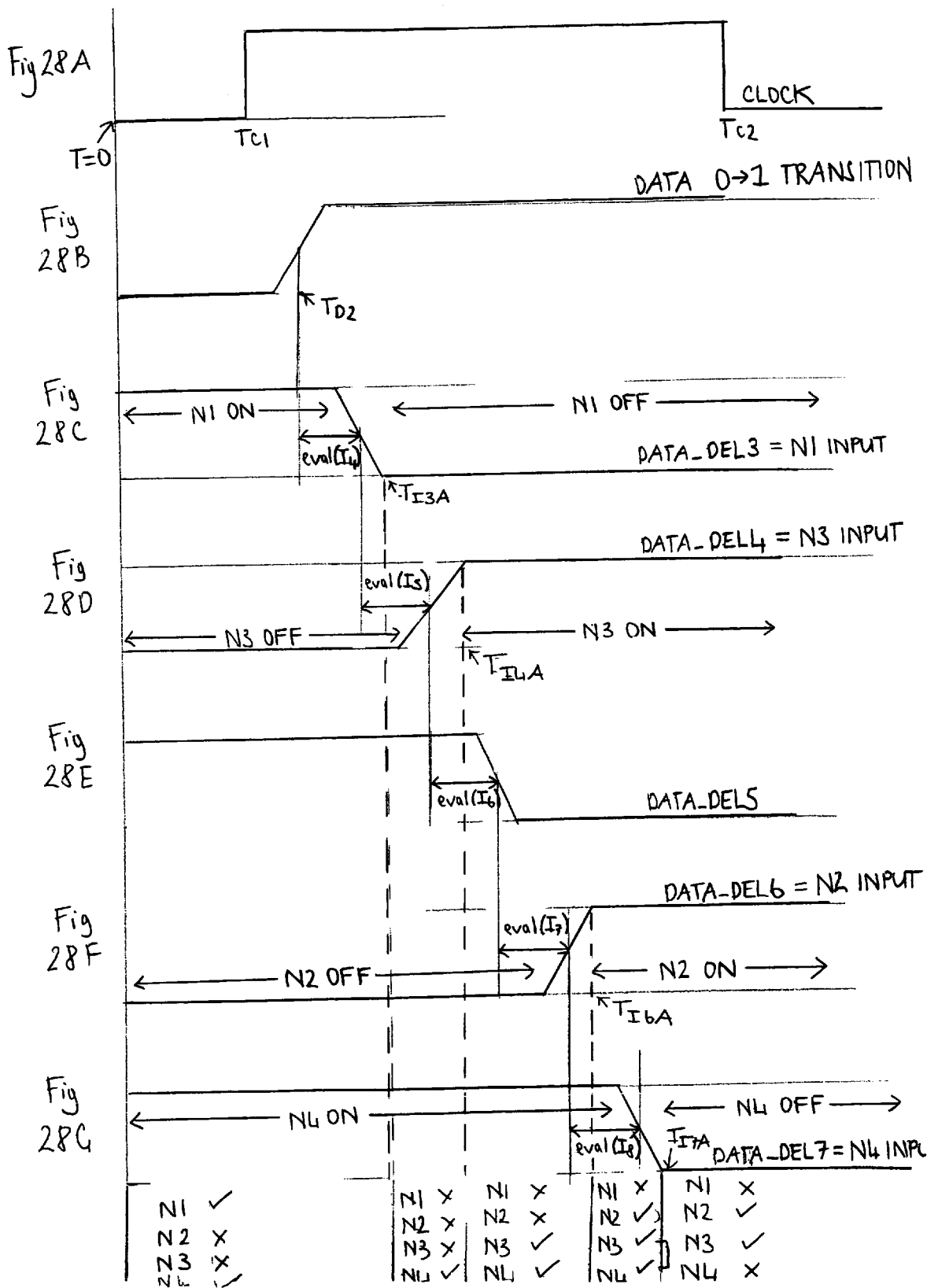
FIGS. 28A to 28G schematically illustrate a functional timing diagram for the signals in the circuit of FIG. 4 when detecting a data transition from the logic level zero to the logic level one.

FIGS. 28A to 28G schematically illustrate a functional timing diagram for the circuit of FIG. 25 for detection of a data transition from logic value zero to logic value one. FIG. 28A shows the clock signal, which is positive for a period from $T_{C1}$ to $T_{C2}$. The data transitions from zero to one as shown in FIG. 28B after time $T_{D2}$, which is just within the positive phase of the clock signal. FIG. 28C shows the profile of the data signal DATA_DEL3, which drives the input of transistor N1. This data signal transitions from one to zero at the time $T_{13A}$, which is later than the time $T_{D2}$ by a time corresponding to the evaluation time of the inverter $I_3$. FIG. 28D schematically illustrates the profile of the data signal DATA_DEL4 which drives the input of the transistor N3. This signal transitions from low to high at a time $T_{14A}$, which is later than the time $T_{13A}$ by a period corresponding to the evaluation time of inverter $I_4$. FIG. 28E shows the profile of the data signal DATA_DEL5 corresponding to the output of the inverter $I_5$. FIG. 28F shows the data profile of the data signal DATA_DEL6, which drives the transistor N2 input and this signal transitions from zero to one at the time $T_{16A}$, which is later than the time $T_{14A}$ by a time corresponding to the evaluation time of inverter $I_5$ and the evaluation time of inverter $I_6$. Finally, FIG. 28G shows the data profile of the data signal DATA_DEL7, which drives the input of the transistor N4. This data signal transitions from one to zero at the time $T_{17A}$. The output of the inverter $I_{10}$ will transition from high to low only in this case if transistors N3, N4 and N5 are all on. As can be seen from FIGS. 28A to 28G there is a time window in which this is the case. In particular, the time window starting at $T_{14A}$ when the transistor N3 switches on until the time $T_{17A}$ when the transistor N4 switches off. There is no time window in which the transistors N1, N2 and N5 are all switched on in this case. Thus it can be seen that a transition in the data from zero to one is indicated by the circuit of FIG. 25 when the transistors N3, N4 and N5 are all high.

Figure 29:
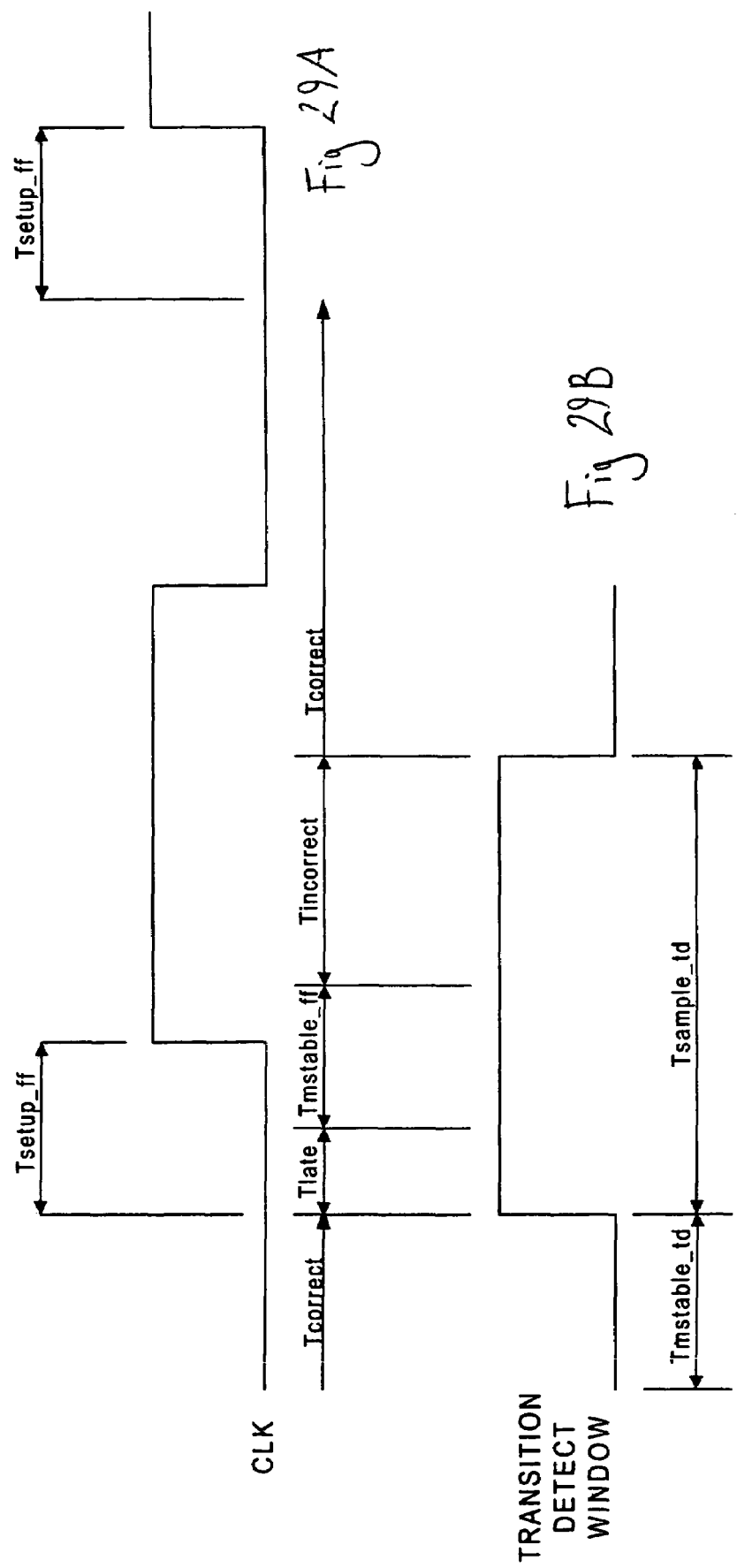
FIGS. 29A to 29B schematically illustrate how the meta-stability windows of the main flip-flop and the transition detector of FIG. 4 are non-overlapping.

FIG. 29A schematically illustrates the functional timing diagram for the main flip-flop 3310 of FIG. 25 whereas FIG. 19B schematically illustrates a functional timing diagram for the transition detector circuit 3350 of FIG. 25. Together, the functional timing diagrams of FIGS. 8A and 8B illustrate how the metastability window of the transition detector is aligned such that it does not overlap with the setup window of the main flip-flop 3210. It is required that the transition detector should detect a transition in either the setup window of the main flip-flop 3310 or in a time window following the rising edge of the clock. Such a transition is indicative of a late signal, such that the main flip-flop may not be outputting the correct value at the specified time. The clock signal illustrated in FIG. 29A is associated with the main flip-flop and shows a setup window Tsetup_ff, which precedes the rising clock edge. There are two requirements that define this setup window for the main flip-flop. The first requirement is that the correct data values should always be reliably sampled and the second requirement is that the output timing (i.e. the clock to data out time) is deterministic and can be characterised. Of these requirements, typically the output timing requirement is (marginally) more stringent than that of sampling the correct value. Accordingly, the setup time Tsetup_ff for the main flip-flop can be sub-divided into two time windows. The first of these time windows is Tlate (see FIG. 29A) and in this time window if a signal transition occurs although the correct value is always sampled. The output timing is not within the specified bounds. The second window within the setup time of the main flip-flop is labelled in FIG. 29A as Tmstable-ff, which is the metastability window of the main flip-flop. In the window Tmstable-ff the correct data value cannot be sampled and the time taken for the output to resolve to a defined value is likely to be non-deterministic.

Referring back to the main flip-flop as illustrated in the circuit diagram of FIG. 25, in the main flip-flop 3310 it is possible that when a transition gate TG1 closes, the voltage levels at nodes M1 and M2 on either side of an invertor situated at the output of the transmission gate TG1 are such that a tri-state invertor F1 arranged in parallel with the inverter at the output of the transmission gate TG1 will always feed back the correct value. However, the time taken for the value to pass through a subsequent transmission gate TG2 and through the nodes S1 and S2, which are on either side of a further inverter subsequent to the output of TG2 and the time taken for the value to pass through the subsequent inverters labelled by Qbar and Q will be longer than the time that would be taken if M2 was at "full-rail" (either Vdd for logic state 1 or GND for logic state 0).

Referring now to FIG. 29B, which is a functional timing diagram associated with the transition detector 3350 of FIG. 25, the transition detector 3350 does not have a setup time to the rising edge of the clock in the same way as the flip-flop 3310 does (and as illustrated in both FIG. 26 and FIG. 29A). Rather, for the transition detector 3350 there is a time window for which a transition in the data input can be reliably detected and this time window is referred to as the "sampling window". In FIG. 29B the sampling window is labelled by Tsample_td. In FIG. 29A the sampling window Tsample_td has been sub-divided into three distinct sub-windows. The first two sub-windows correspond to the sub-windows Tlate and Tmstable-ff of the main flip-flop as described above. A third sub-window Tincorrect, which is adjacent to the window Tmstable_ff forms together with Tlate and Tmstable_ff the full time window Tsample_td in which a transition in the data signal must be detected by the transition detector 3350. If the data signal transitions in the sub-window Tlate, then the Q output of the flip-flop 3310 of FIG. 25 will be correct but the transition will be late. If the data transition occurs in the time window Tmstable_ff, then the master latch part of the flip-flop 3310 may become metastable thus leading to an incorrect and/or late value being output by the circuit. Finally if the transition occurs in the sub-window Tincorrect then the output will have an incorrect value and the transmission gate TG1 in FIG. 25 will have completely shut before the new signal value arrives. The portion of the cycle subsequent to Tincorrect in FIG. 29A and indicated by Tcorrect represents the remainder of the timing cycle during which a transition is not indicative of an error. Note that the operational parameters of the device of FIG. 25 are arranged such that an input signal to the main flip-flop 3310 will never evaluate later than in the Tincorrect window. This arrangement also imposes a constraint on the hold time of the input to the main flip-flop 3310, such that the earliest input to the main flip-flop can change is the start of the Tcorrect window.

The transition detector 3350 also has a metastability window, which is indicated as Tmstable_td in FIG. 29B and this time window precedes the time window Tsample_td. If a transition occurs in the time window Tmstable_td then the Err_dyn mode shown in FIG. 25 may become metastable resulting in the error output becoming unknown (i.e. logic 1, logic 0 or some intermediate value). However, by designing the circuit such that Tmstable_td occurs within the window Tcorrect as shown, yet does not overlap with Tlate, Tmstable_ff or Tincorrect, then it is known that if the metastability does occur in the transition detector 3350 then the Q output of the main flip-flop 3310 both have the correct value and output timing. This enables the use of standard synchronising logic to be applied to the output of logic driven by the error signal. This is illustrated in FIG. 30.

Figure 30:
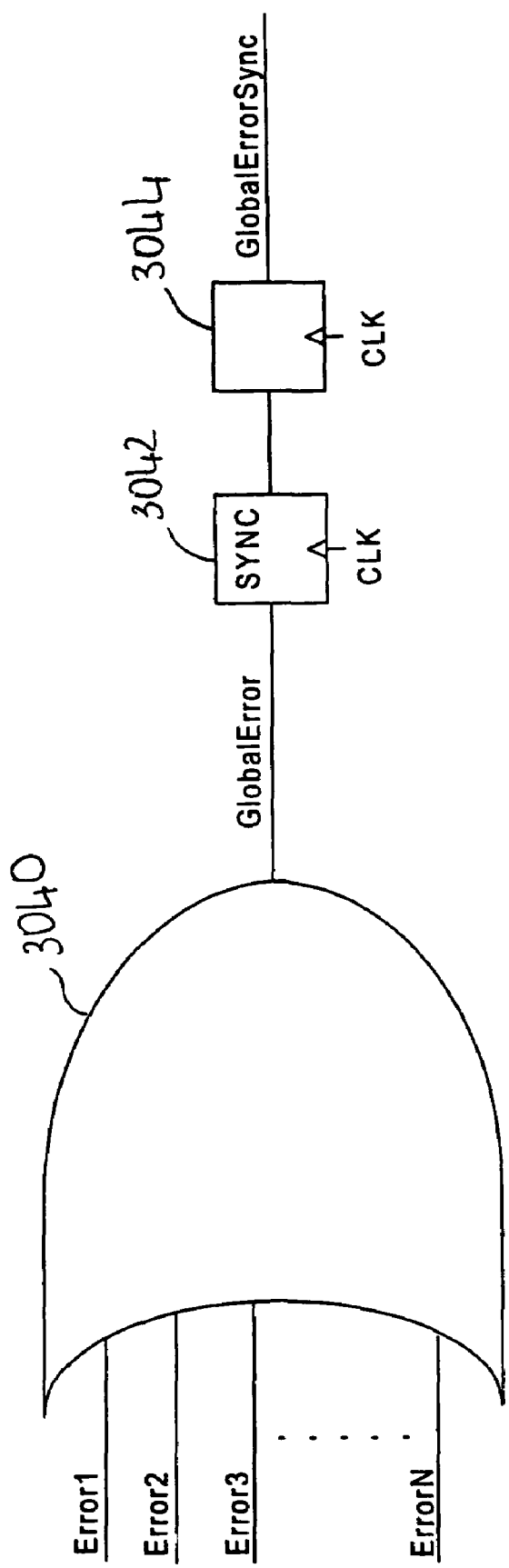
FIG. 30 schematically illustrates error synchronisation of error signals derived from transition detectors.

FIG. 30 schematically illustrates error synchronisation of error signals derived from transition detectors. The arrangement of FIG. 30 comprises the OR gate 3040 (corresponding to that illustrated in FIG. 22), a first flip-flop 3042 and a second flip-flop 3044 to which the output of the OR gate 3040 is supplied in succession. The first flip-flop 3042 is designed specifically for fast metastability resolution and has very high gain in the feedback loop, which is the cause of metastability. A standard flip-flop typically has less gain in the feedback loop than the flip-flop 3042 since there are design tradeoffs between the gain and the other parameters of the flip-flop such as setup time and area. The second flip-flop 3044 is a standard flip-flop. As shown in FIG. 30 the number of error signals, error 1, error 2, error 3, . . . error N, which are derived from individual transition detectors are ORed together to form GlobalError signal. If any one of the individual error signals that are input to the OR gate 3040 is metastable then this can also result in metastability or non-deterministic timing of the output GlobalError signal. The GlobalError signal is passed through a standard arrangement for synchronising a signal to a particular clock domain consisting of the two flip-flops 3042 and 3044. The output of the second flip-flop 3044 is a synchronised version of the GlobalError signal since it has a voltage level corresponding to a definite logic value and has deterministic timing. This signal is labelled GlobalErrorSync in FIG. 30.

In the situation where the GlobalError signal is metastable then the GlobalErrorSync signal may be either a logic 0 or a logic 1. The GlobalErrorSync signal is used by the error recovery logic 3050 of FIG. 22 to determine when an error in operation has occurred. Since the metastability window of the transition detector 3350 lies entirely within the Tcorrect time window (refer to FIGS. 29A and 29B), in the event that the transition detector 3350 becomes metastable then the resulting value of the GlobalErrorSync signal will correspond to a "don't care" condition. In the event of a GlobalErrorSync signal indicating the logic value 1 in this case, the error recovery process will be initiated although this is benign.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An integrated circuit for performing digital data processing, said integrated circuit comprising:
    an error detection circuit operable to detect a transition in a signal value in a predetermined time window within said integrated circuit indicative of an error in operation of said integrated circuit;
    an error-recovery circuit responsive to said error detection circuit and operable to enable said integrated circuit to recover from said error in operation;
    an operational parameter controller operable to control one or more performance controlling operational parameters of said integrated circuit;
    wherein said operational parameter controller dynamically controls at least one of said one or more performance controlling parameters in dependence upon one or more characteristics of errors detected by said error detection circuit to maintain a non-zero rate of errors in operation, said error-recovery circuit being operable to enable the integrated circuit to recover from said errors in operation such that data processing by said integrated circuit continues.

2. An integrated circuit as claimed in claim 1, comprising a storage unit operable to store a recoverable state of said data processing apparatus, said recoverable state comprising at least a subset of architectural state variables corresponding to a programmer's model of said integrated circuit and wherein said error-recovery circuit operable to use said stored recoverable state to enable said integrated circuit to recover from said error in operation.

3. An integrated circuit as claimed in claim 1, in which said recoverable state comprises at least a subset of microarchitectural state variables.

4. An integrated circuit as claimed in claim 1, in which said error detection circuit is arranged to detect said transition by calculating a difference between said signal value at a first sampling time and said signal value at a second, subsequent sampling time.

5. An integrated circuit as claimed in claim 1, in which said error detection circuit is operable to detect an error in an output signal of an associated processing circuit element of said integrated circuit.

6. An integrated circuit as claimed in claim 1, in which said error detection circuit comprises at least one of a zero-to-one transition detector and a one-to-zero transition detector.

7. An integrated circuit as claimed in claim 1, in which said storage unit is a register bank operable to store confirmed state variables, said confirmed state variables having been confirmed to be unaffected by said errors in operation.

8. An integrated circuit as claimed in claim 1, in which said integrated circuit comprises a speculative register bank operable to store speculative state variables whose values have not been confirmed as being unaffected by said errors in operation and in which said storage unit is a confirmed register bank operable to store confirmed state variables whose values have been confirmed as being correct values.

9. An integrated circuit as claimed in claim 8, in which said error recovery circuit is operable to replace a subset of said speculative state variables in-said speculative register bank by corresponding ones of said confirmed state variables from said confirmed register bank in the event that said error detection circuit detects an error in operation.

10. An integrated circuit as claimed in claim 1 in which said operational parameter controller is operable to at least temporarily adjust one or more of said performance controlling parameters after a time delay following detection of said error in operation.

11. An integrated circuit as claimed in claim 10, comprising a deadlock detection module operable to detect repetition of an error in operation corresponding to a given instruction and in which said operational parameter controller is operable to temporarily adjust one or more of said performance controlling parameters in response to said detected repetition.

12. An integrated circuit as claimed in claim 1, in which said error detection circuit is arranged to detect said transition by detecting any change of state in said signal value within said predetermined time window.

13. An integrated circuit as claimed in claim 12, in which said integrated circuit comprises a plurality of error detection circuits associated with a respective plurality of processing circuit elements.

14. An integrated circuit as claimed in claim 12, in which said integrated circuit has an instruction pipeline comprising a plurality of pipeline stages.

15. An integrated circuit as claimed in claim 12, in which said error detection circuit comprises at least one delay element arranged to delay an input digital signal to enable detection of said transition when said transition ocurs during a a set-up time of said processing circuit element.

16. An integrated circuit as claimed in claim 12, in which said integrated circuit has an error detection circuit metastability window that is mutually exclusive with a setup window of said associated processing circuit element.

17. An integrated circuit as claimed in claim 16, in which said associated processing circuit element is a latch for passing data between consecutive ones of said plurality of pipeline stages.

18. An integrated circuit as claimed in claim 12, in which said error recovery circuit comprises at least one stability pipeline stage operable to enable verification of output values of said plurality of pipeline stages prior to commitment of said output values as state variables of said integrated circuit.

19. An integrated circuit as claimed in claim 18, in which said integrated circuit comprises data forwarding circuitry operable to supply a value calculated by a particular one of said plurality of pipeline stages directly from said particular pipeline stage to another different one of said plurality of pipeline stages for use as an input value for a different pipeline stage.

20. A method of controlling an integrated circuit for performing digital data processing, said method comprising the steps of:
   detecting a transition in a signal value in a predetermined time window within said integrated circuit indicative of an error in operation of said integrated circuit;
   responding to said detection of an error in operation by enabling said integrated circuit to recover from said error in operation;
   controlling one or more performance controlling operational parameters of said integrated circuit;
   wherein at least one of said one or more performance controlling parameters is dynamically controlled in dependence upon one or more characteristics of errors detected in said detecting step to maintain a non-zero rate of errors in operation, said errors in operation being recovered from such that data processing by said integrated circuit continues.

21. An integrated circuit for performing digital data processing, said integrated circuit comprising:
   means for detecting a transition in a signal value in a predetermined time window within said integrated circuit indicative of an error in operation of said integrated circuit;
   means for performing error-recovery responsive to said error detection circuit and operable to enable said integrated circuit to recover from said error in operation;
   means for controlling one or more performance controlling operational parameters of said integrated circuit;
   wherein said means for controlling dynamically controls at least one of said one or more performance controlling parameters in dependence upon one or more characteristics of errors detected by said means for detecting a transition to maintain a non-zero rate of errors in operation, said means for performing error-recovery being operable to enable the integrated circuit to recover from said errors in operation such that data processing by said integrated circuit continues.

* * * * *

UNITED STATES PATENT AND TRADEMARK OFFICE
CERTIFICATE OF CORRECTION

PATENT NO. : 7,320,091 B2
APPLICATION NO. : 11/110961
DATED : January 15, 2008
INVENTOR(S) : Blaauw et al.

It is certified that error appears in the above-identified patent and that said Letters Patent is hereby corrected as shown below:

Title page, (63) Related U.S. Application Data, "Continuation of application No. 10/779,805," should read "Continuation-in-part of application No. 10/779,805,"

Column 1, lines 4 and 5, "continuation of application Ser. No. 10/779,805," should read "continuation-in-part of application Ser. No. 10/779,805,"

Signed and Sealed this

Twenty-second Day of September, 2009

David J. Kappos
*Director of the United States Patent and Trademark Office*